(12) United States Patent
Beuk et al.

(10) Patent No.: US 11,009,424 B2
(45) Date of Patent: May 18, 2021

(54) DENSE PHASE PUMP DIAGNOSTICS

(71) Applicant: NORDSON CORPORATION, Westlake, OH (US)

(72) Inventors: Edwin Jeroen Beuk, Hamont-Achel (BE); Terrence M. Fulkerson, Brunswick Hills, OH (US); Jeffrey A. Perkins, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/700,271

(22) Filed: Dec. 2, 2019

(65) Prior Publication Data

US 2020/0110001 A1 Apr. 9, 2020

Related U.S. Application Data

(63) Continuation of application No. 15/307,347, filed as application No. PCT/US2015/030752 on May 14, 2015, now Pat. No. 10,533,915.

(Continued)

(51) Int. Cl.
*G01M 3/28* (2006.01)
*B05B 7/14* (2006.01)
(Continued)

(52) U.S. Cl.
CPC ......... *G01M 3/2876* (2013.01); *B05B 7/1459* (2013.01); *B05B 15/14* (2018.02);
(Continued)

(58) Field of Classification Search
CPC ..... G01M 3/2876; B05B 15/14; B05B 7/1459
(Continued)

(56) References Cited

U.S. PATENT DOCUMENTS 6,325,572 B1 12/2001 Dietrich
7,150,585 B2 12/2006 Kleineidam et al.
(Continued)

FOREIGN PATENT DOCUMENTS

CN 87106757 A 8/1988
CN 1234008 A 11/1999
(Continued)

OTHER PUBLICATIONS

English Translation of CN Office Action dated Mar. 20, 2018 for CN Application No. 201580026377.
(Continued)

*Primary Examiner* — Tarun Sinha
(74) *Attorney, Agent, or Firm* — BakerHostetler

(57) ABSTRACT

A diagnostic apparatus for a powder coating material pump. The diagnostic apparatus includes a detector that uses pressure or flow to detect a fault in the pump, the diagnostic apparatus being external the pump, internal the pump or a combination of external and internal the pump. Another diagnostic device is provided for a powder coating material pump, and includes a light source in close proximity to the pump, the light source having an on condition and an off condition wherein one or both of the on condition and off condition provides information about the pump performance. An exemplary pump is a dense phase powder coating material pump.

19 Claims, 28 Drawing Sheets

Related U.S. Application Data

(60) Provisional application No. 61/993,672, filed on May 15, 2014.

(51) Int. Cl.
*B05B 15/14* (2018.01)
*F04B 51/00* (2006.01)
*F04F 5/44* (2006.01)
*F04F 5/14* (2006.01)

(52) U.S. Cl.
CPC ............... *F04B 51/00* (2013.01); *F04F 5/44* (2013.01); *F04F 5/14* (2013.01)

(58) Field of Classification Search
USPC ........................................................... 73/40
See application file for complete search history.

(56) References Cited

U.S. PATENT DOCUMENTS

| | | | | |
|---|---|---|---|---|
| 7,869,971 | B2* | 1/2011 | Varga | F16K 37/0083 |
| | | | | 702/113 |
| 9,745,148 | B2 | 8/2017 | Mauchle et al. | |
| 2002/0129640 | A1* | 9/2002 | Summers | F17D 5/04 |
| | | | | 73/46 |
| 2005/0229845 | A1 | 10/2005 | Mather et al. | |
| 2007/0092380 | A1 | 4/2007 | Fulkerson et al. | |
| 2009/0004028 | A1 | 1/2009 | Hihn et al. | |
| 2010/0028090 | A1 | 2/2010 | Mauchle et al. | |
| 2011/0023709 | A1* | 2/2011 | Bosshard | B01D 46/0086 |
| | | | | 95/19 |
| 2011/0252897 | A1 | 10/2011 | Swenson et al. | |
| 2012/0024976 | A1 | 2/2012 | Betcher et al. | |
| 2012/0209437 | A1 | 8/2012 | Fulkerson et al. | |
| 2013/0221129 | A1 | 8/2013 | Kyugo | |
| 2014/0112802 | A1 | 4/2014 | Hannemann et al. | |
| 2014/0283582 | A1 | 9/2014 | Mills | |
| 2016/0122138 | A1* | 5/2016 | Mauchle | B05B 7/1404 |
| | | | | 406/14 |

FOREIGN PATENT DOCUMENTS

| | | |
|---|---|---|
| CN | 101142030 A | 3/2008 |
| CN | 103201202 A | 7/2013 |
| CN | 103765007 A | 4/2014 |
| EP | 0264148 A1 | 4/1988 |
| EP | 1728558 A2 | 12/2006 |
| EP | 1772195 A2 | 4/2007 |
| EP | 2090371 A2 | 8/2009 |
| JP | 11-271167 A | 10/1999 |
| JP | 2003-166477 A | 6/2003 |
| JP | 2007-106600 A | 4/2007 |
| WO | 2005/018823 A2 | 3/2005 |
| WO | 2008/093185 A1 | 8/2008 |

OTHER PUBLICATIONS

English Translation of JP Office Action dated Mar. 28, 2019 for JP Application No. 2017512858.
European search report dated Jun. 25, 2019 for EP Application No. 19153928.
International Patent Application No. PCT/US2015/030752; Int'l Preliminary Report on Patentability; dated Nov. 24, 2016; 7 pages.

* cited by examiner

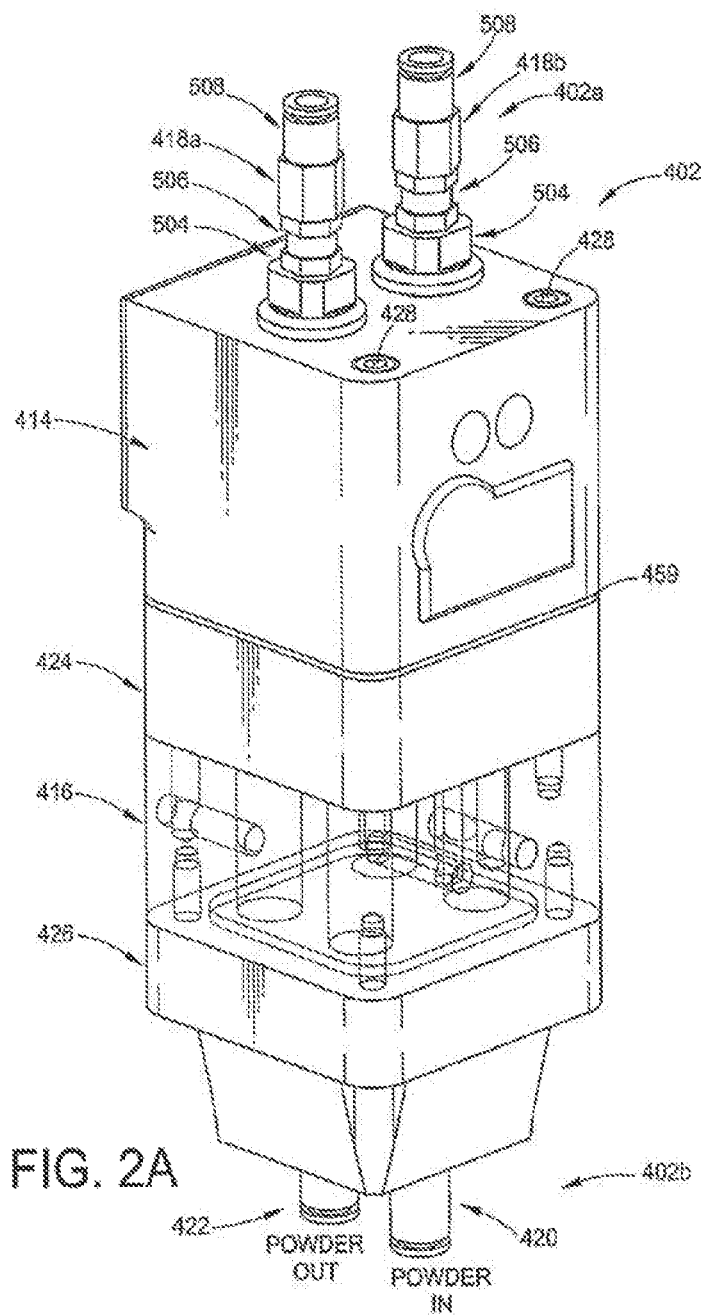

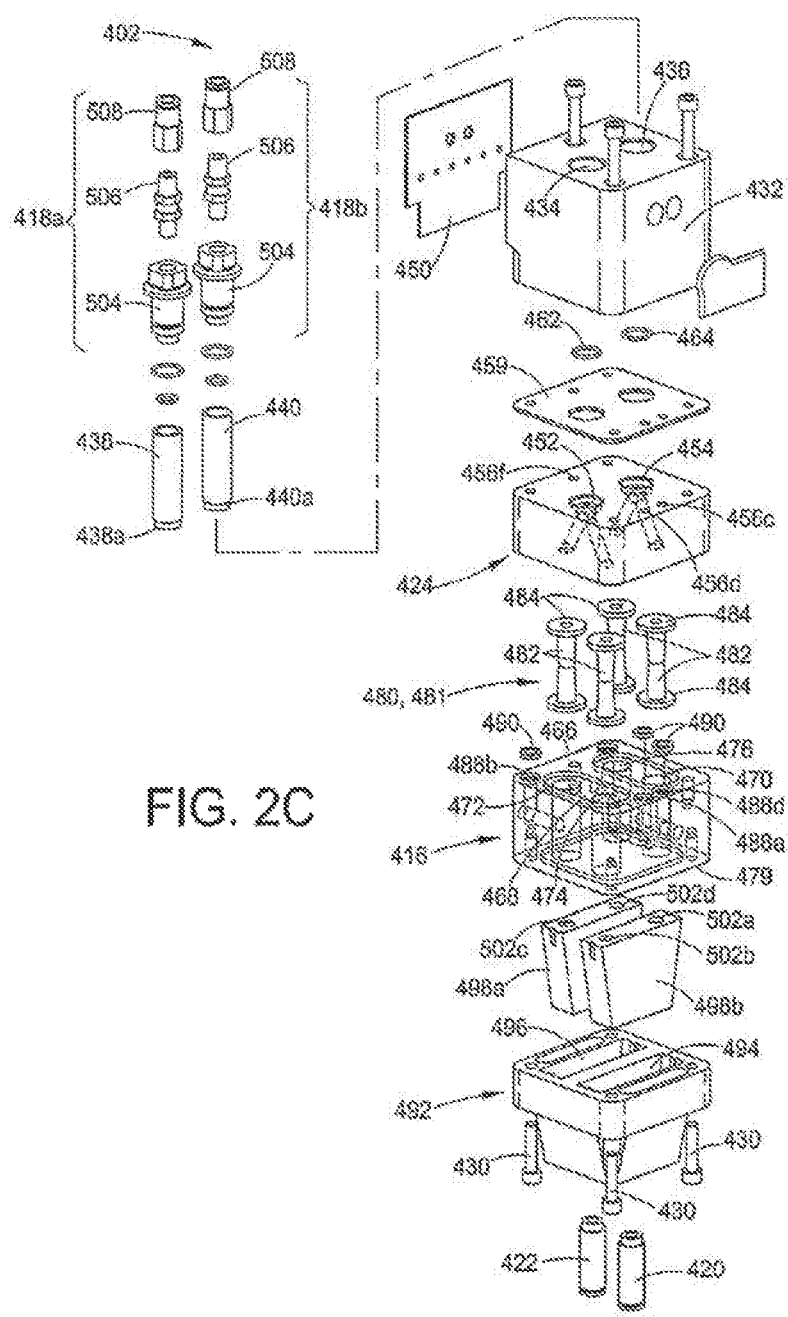

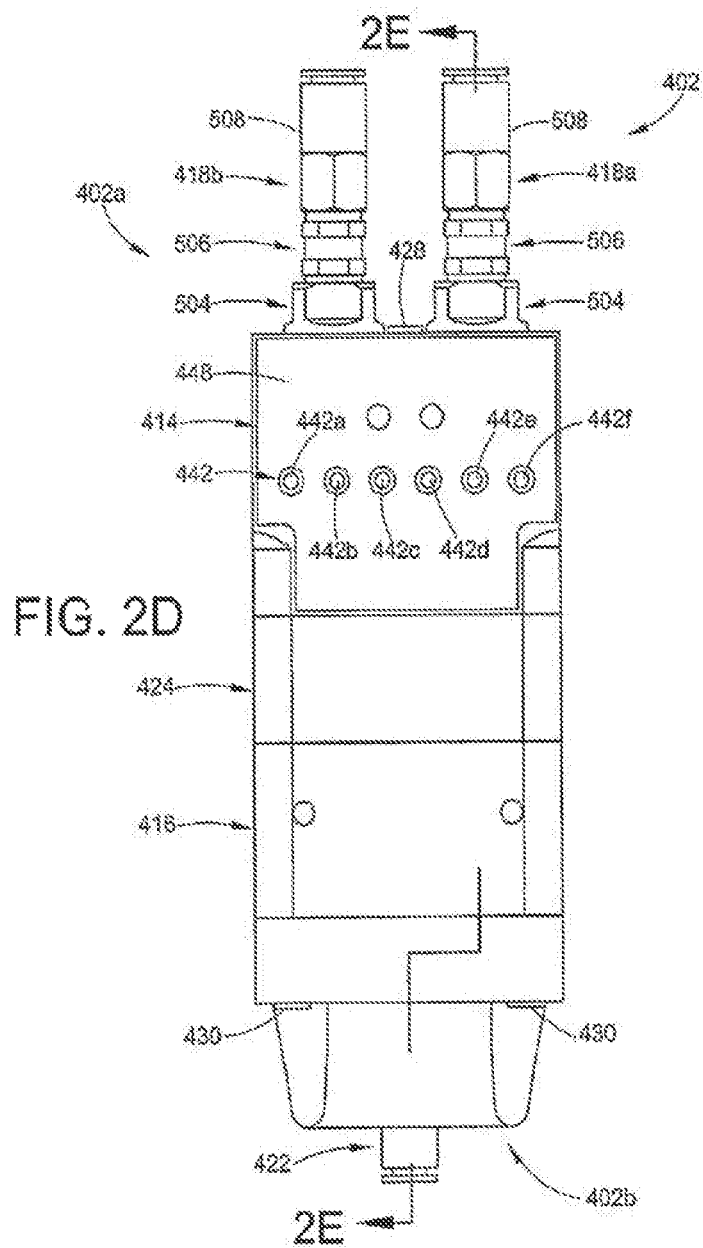

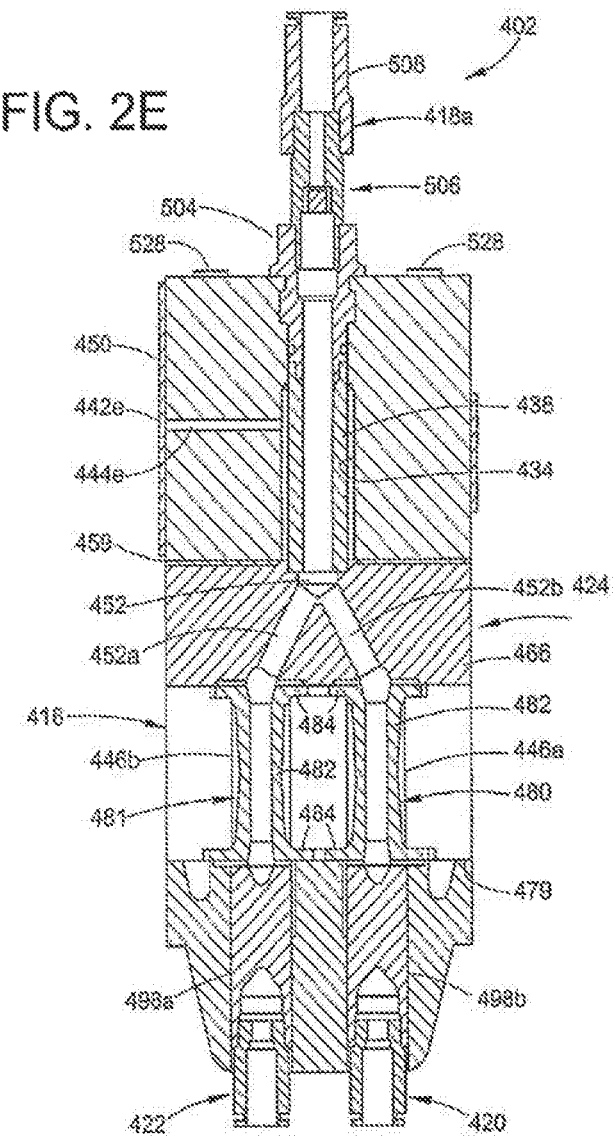

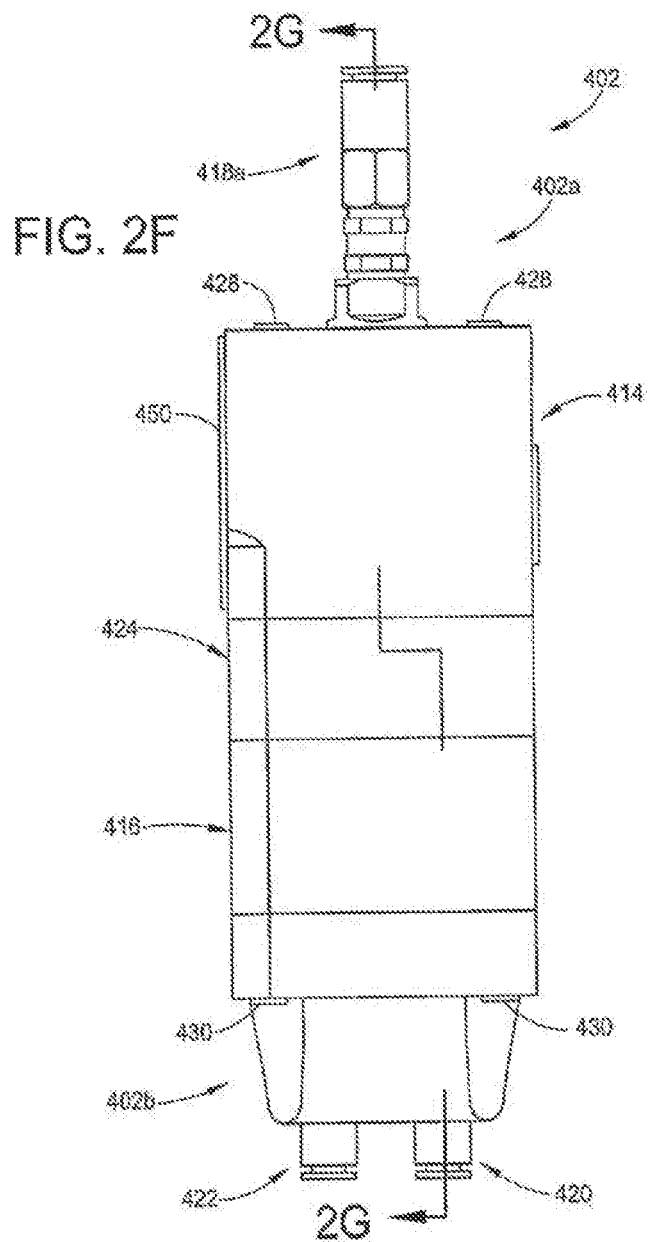

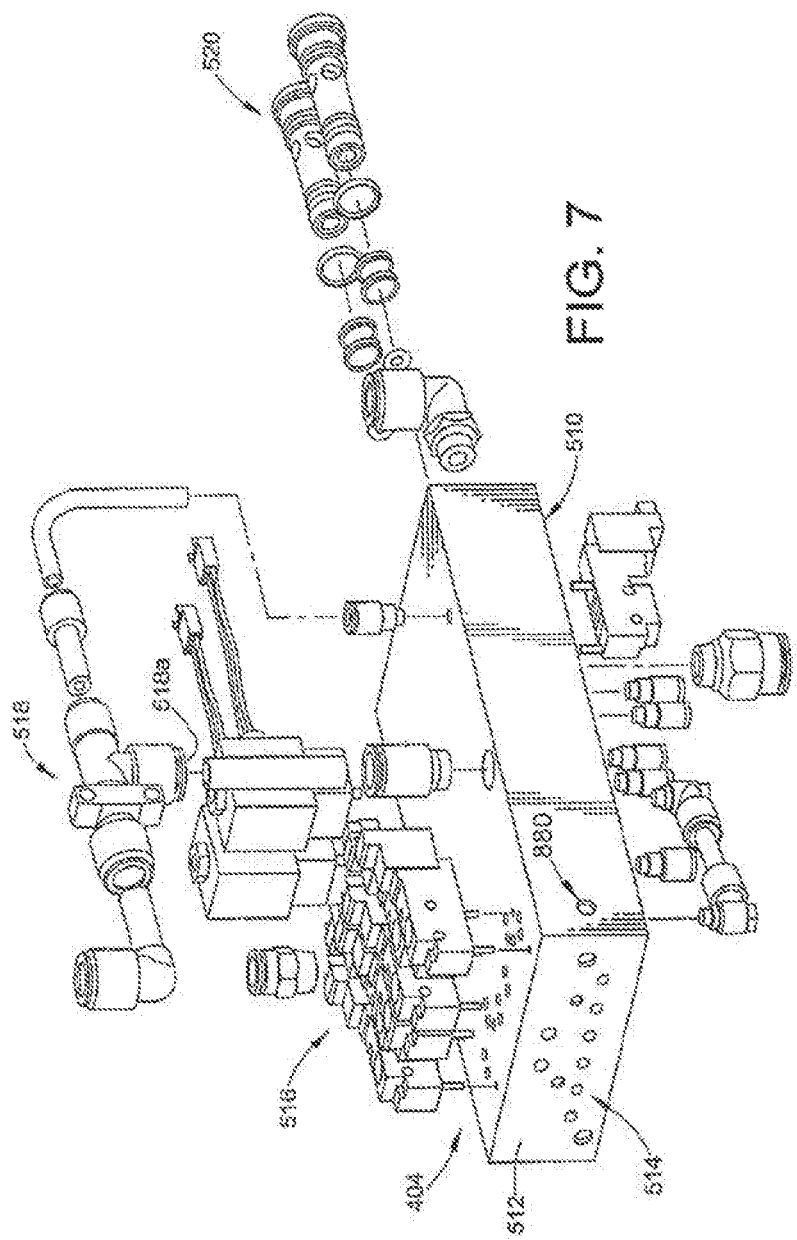

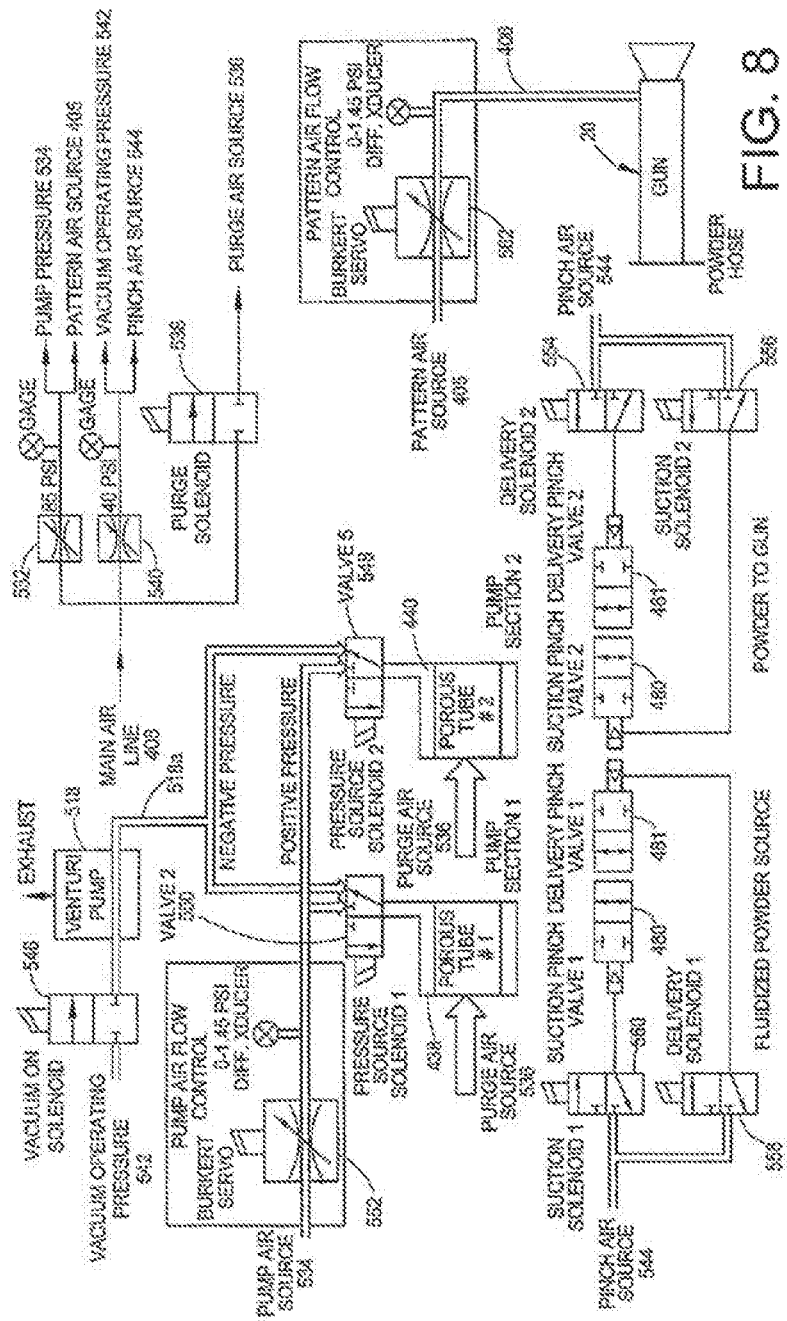

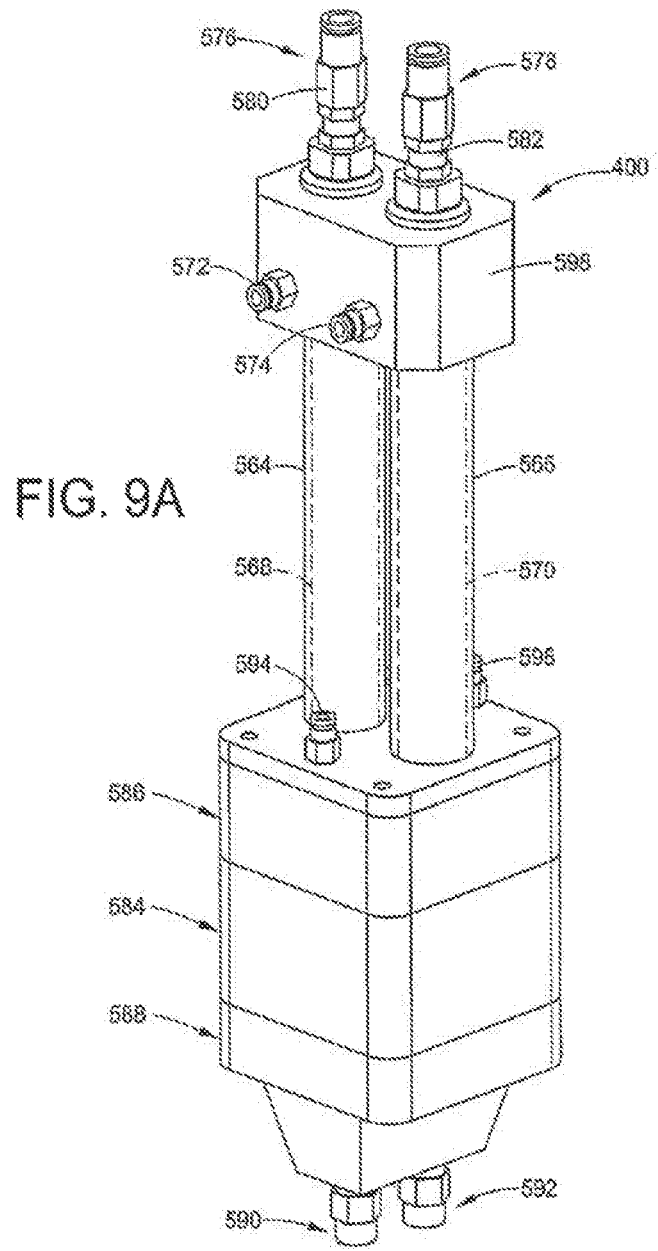

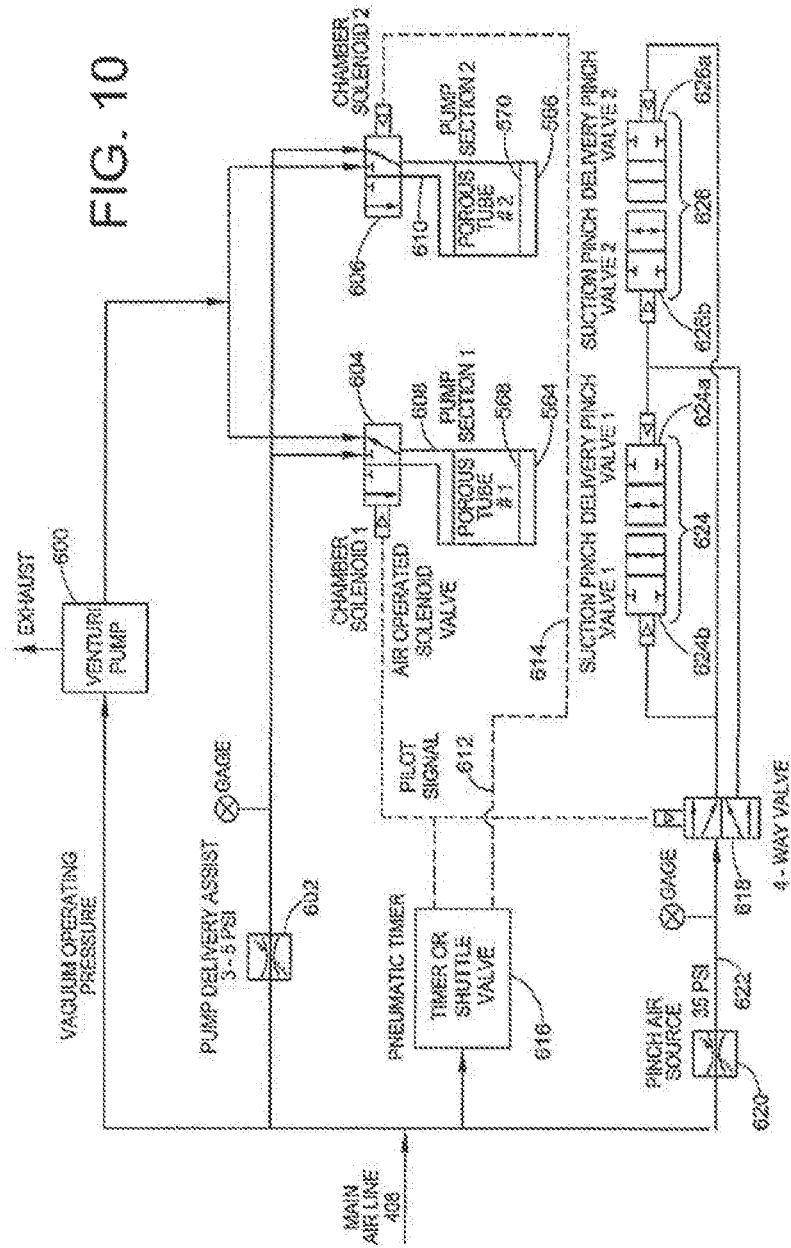

FIG. 16A

| FIG 16 |
|---|
| FIG 16A |
| FIG 16B |
| FIG 16C |
| FIG 16D |

| NO | TEST | SOLENOID | | | | | | | PINCH VALVE | | | | CONVEYANCE AIR | SUCTION PORT | DELIVERY PORT | RESULTS |
| | | 1 | 2 | 3 | 4 | 5 | 6 | 7 | A | B | C | D | | | | |
| 0 | VACUUM CHECK SUCTION | OFF | ON | OFF | OFF | ON | OFF | ON | OPEN | CLOSED | CLOSED | OPEN | 0.00 | VACUUM GAUGE <-14IN HG | VACUUM GAUGE ~0 | VACUUM MEASURED ON SUCTION |
| 1 | VACUUM CHECK DELIVERY | ON | OFF | OFF | OFF | ON | ON | ON | CLOSED | OPEN | OPEN | CLOSED | 0.00 | VACUUM GAUGE ~0 | VACUUM GAUGE <-14IN HG | VACUUM MEASURED ON DELIVERY |
| 2A | PINCH B&C LEAK | ON | OFF | OFF | OFF | ON | ON | ON | CLOSED | OPEN | OPEN | CLOSED | 0.00 | | VACUUM GAUGE <-14IN HG | IF GAUGE <0 PINCH VALVE B OR C LEAK |
| 2B | (TURN OFF 7 LAST) | ON | ON | OFF | OFF | ON | ON | OFF | CLOSED | CLOSED | CLOSED | CLOSED | 0.00 | | VACUUM LEAK DOWN > 30 SEC | VACUUM TRAPPED IN DELIVERY |
| 3A | PINCH A&D LEAK | OFF | ON | OFF | OFF | ON | OFF | ON | OPEN | CLOSED | CLOSED | OPEN | 0.00 | VACUUM GAUGE <-14IN HG | | IF GAUGE <0 PINCH VALVE A OR D LEAK |
| 3B | (TURN OFF 7 LAST) | ON | ON | OFF | OFF | ON | ON | OFF | CLOSED | CLOSED | CLOSED | CLOSED | 0.00 | VACUUM LEAK DOWN > 30 SEC | | |

FIG. 16B

| | | | | | | | | | | | | | |
|---|---|---|---|---|---|---|---|---|---|---|---|---|---|
| PRESSURE | | | | | | | | | | | | | |
| 4 | POROUS TUBE #1 | ON | OFF | ON | OFF | ON | OFF | CLOSED | OPEN | CLOSED | CLOSED | 1.00 | GAUGE WITH ORIFICE = 0 | GAUGE WITH ORIFICE >0 | GAUGE SHOULD READ >4 PSI |
| 5 | POROUS TUBE #2 | ON | OFF | ON | OFF | ON | OFF | CLOSED | OPEN | CLOSED | 1.00 | GAUGE WITH ORIFICE = 0 | GAUGE WITH ORIFICE >0 | GAUGE SHOULD READ >4 PSI |
| SUCTION | | | | | | | | | | | | | |
| 6 | POROUS TUBE #1 | OFF | ON | OFF | ON | OFF | ON | OPEN | CLOSED | CLOSED | 0.00 | SUCTION PORT METER / EXTERNAL | | MEASURE / VERIFY AIR FLOW THROUGH RIGHT SIDE OF PUMP |
| 7 | POROUS TUBE #2 | OFF | ON | OFF | ON | OFF | ON | CLOSED | CLOSED | OPEN | 0.00 | SUCTION PORT METER / EXTERNAL | | MEASURE / VERIFY AIR FLOW THROUGH RIGHT SIDE OF PUMP |
| 8 | PINCH A,B,C, D LEAK | ON | OFF | ON | OFF | ON | OFF | CLOSED | CLOSED | CLOSED | 1.00 | FLOW 0 / INTERNAL | PLUGGED | TEST ALL VALVES AT ONCE, BUT WON'T DETERMINE WHICH VALVE IS ACTUALLY BAD |

FIG. 16C

| | | | | | | | | | | | | |
|---|---|---|---|---|---|---|---|---|---|---|---|---|
| 9 | PINCH A LEAK | ON | OFF | OFF | OFF | OFF | OFF | CLOSED | OPEN | OPEN | 1.00 | TRANSDUCER A INTERNAL | PLUGGED | MEASURE PRESSURE DECAY OR FLOW |
| 10 | PINCH B LEAK | OFF | ON | OFF | OFF | OFF | OFF | OPEN | CLOSED | CLOSED | 1.00 | TRANSDUCER B INTERNAL | PLUGGED | MEASURE PRESSURE DECAY OR FLOW |
| 11 | PINCH C LEAK | OFF | OFF | ON | OFF | ON | OFF | OPEN | OPEN | CLOSED | 1.00 | TRANSDUCER C INTERNAL | PLUGGED | MEASURE PRESSURE DECAY OR FLOW |
| 12 | PINCH D LEAK | OFF | OFF | OFF | ON | OFF | OFF | OPEN | OPEN | CLOSED | 1.00 | TRANSDUCER D INTERNAL | PLUGGED | MEASURE PRESSURE DECAY OR FLOW |
| 13 | PINCH A LEAK | ON | OFF | OFF | OFF | OFF | OFF | CLOSED | OPEN | OPEN | 1.00 | PLUGGED | PLUGGED | AIR WILL EXIT OUT OF THE PINCH VALVE IF BAD |
| 14 | PINCH B LEAK | OFF | ON | OFF | OFF | OFF | OFF | OPEN | CLOSED | OPEN | 1.00 | PLUGGED | PLUGGED | |
| 15 | PINCH C LEAK | OFF | OFF | ON | OFF | ON | OFF | OPEN | OPEN | CLOSED | 1.00 | PLUGGED | PLUGGED | |
| 16 | PINCH D LEAK | OFF | OFF | OFF | ON | OFF | OFF | OPEN | OPEN | CLOSED | 1.00 | PLUGGED | PLUGGED | |
| 17 | PINCH A LEAK | ON | OFF | OFF | OFF | OFF | OFF | CLOSED | OPEN | OPEN | 1.00 | TEE AND GAGE | TEE AND GAGE | IF PINCH VALVE IS GOOD, THEN THE GAGE ON THE SUCTION / DELIVERY PORT WILL READ 0 |
| 18 | PINCH B LEAK | OFF | ON | OFF | OFF | OFF | OFF | OPEN | CLOSED | OPEN | 1.00 | TEE AND GAGE | TEE AND GAGE | |
| 19 | | OFF | OFF | ON | OFF | ON | OFF | OPEN | OPEN | CLOSED | 1.00 | TEE AND GAGE | TEE AND GAGE | |
| 20 | PINCH D LEAK | OFF | OFF | OFF | ON | OFF | OFF | OPEN | OPEN | CLOSED | 1.00 | TEE AND GAGE | TEE AND GAGE | |

FIG. 16D

| | | | | | | | | | | | | |
|---|---|---|---|---|---|---|---|---|---|---|---|---|
| 21 | PUMP PRESSURE TEST | OFF | OFF | ON | ON | OFF | OFF | OPEN | OPEN | OPEN | OPEN | 1.00 | | PLUGGED OR GAGE / TRANSDUCER | PLUGGED OR GAGE / TRANSDUCER | MEASURE PRESSURE DECAY OR FLOW THROUGH 718 |
| 22 | PUMP PRESSURE TEST | OFF | OFF | ON | ON | OFF | OFF | OPEN | OPEN | OPEN | OPEN | 1.00 | | PLUGGED OR GAGE / TRANSDUCER | PLUGGED OR GAGE / TRANSDUCER | MEASURE PRESSURE DECAY OR FLOW THROUGH 718 |

DENSE PHASE PUMP DIAGNOSTICS

RELATED APPLICATION

This application is a continuation application of U.S. Non-Provisional patent application Ser. No. 15/307,347, filed Oct. 27, 2016, which is a U.S. National Stage Application of International Patent Application no. PCT/US2015/30752, filed May 14, 2015, which claims the benefit of U.S. Provisional Patent Application Ser. No. 61/993,672, filed on May 15, 2014 for DENSE PHASE PUMP DIAGNOSTICS, the entire disclosures of each of which are fully incorporated herein by reference as if set forth in their entirety herein.

TECHNICAL FIELD OF THE INVENTIONS

The inventions relate generally to powder coating material application systems. More particularly, the inventions relate to diagnostic apparatus and methods for a powder coating material pump.

BACKGROUND OF THE INVENTIONS

Material application systems are used to apply one or more materials in one or more layers to an object. General examples are powder coating systems, other particulate material application systems such as may be used in the food processing and chemical industries. These are but a few examples of a wide and numerous variety of systems used to apply particulate materials to an object.

The application of dry particulate material is especially challenging on a number of different levels. An example, but by no means a limitation on the use and application of the present inventions, is the application of powder coating material to objects using a powder spray gun. Because sprayed powder tends to expand into a cloud or diffused spray pattern, known powder application systems use a spray booth for containment. Powder particles that do not adhere to the target object are generally referred to as powder overspray, and these particles tend to fall randomly within the booth and will alight on almost any exposed surface within the spray booth. Therefore, cleaning time and color change times are strongly related to the amount of surface area that is exposed to powder overspray.

There are two generally known types of dry particulate material transfer processes, referred to herein as dilute phase and dense phase. Dilute phase systems utilize a substantial quantity of air to push material through one or more hoses or other conduit from a supply to a spray applicator. A common pump design used in powder coating systems is a venturi pump which introduces a large volume of air under pressure and higher velocity into the powder flow. In order to achieve adequate powder flow rates (in pounds per minute or pounds per hour for example), the components that make up the flow path must be large enough to accommodate the flow with a high air to material ratio (in other words lean flow) otherwise significant back pressure and other deleterious effects can occur.

Dense phase systems on the other hand are characterized by a high material to air ratio (in other words a "rich" flow). A dense phase pump is described in U.S. Pat. No. 7,150,585, issued on Dec. 19, 2006, filed under Ser. No. 10/501,693 on Jul. 16, 2004 for PROCESS AND EQUIPMENT FOR THE CONVEYANCE OF POWDERED MATERIAL, the entire disclosure of which is fully incorporated herein by reference, and which is owned by the assignee of the present inventions. This pump is characterized in general by a pump chamber that is partially defined by a gas permeable member. Material, such as powder coating material as an example, is drawn into the chamber at one end by gravity and/or negative pressure and is pushed out of the chamber through an opposite end by positive air pressure. This pump design is very effective for transferring material, in part due to the novel arrangement of a gas permeable member forming part of the pump chamber.

SUMMARY OF THE DISCLOSURE

A first inventive concept presented herein provides a diagnostic apparatus for a powder coating material pump. In an embodiment, the diagnostic apparatus includes a detector that uses pressure or flow or both to detect a fault in the pump. Additional embodiments are disclosed herein.

A second inventive concept presented herein provides a diagnostic apparatus for a powder coating material pump. In an embodiment, the diagnostic apparatus detects a fault in a pinch valve or an air permeable member or both using pressure or flow. Additional embodiments are disclosed herein.

A third inventive concept presented herein provides a diagnostic apparatus for a powder coating material pump. In an embodiment, the diagnostic apparatus includes a detector that uses pressure or flow or both to detect a fault in the pump, the diagnostic apparatus being connectable to an inlet port of the pump, an outlet port of the pump or both. Additional embodiments are disclosed herein.

A fourth inventive concept presented herein provides a diagnostic method for a powder coating material pump. In an embodiment, pressure or flow or both are used to detect a fault in the pump. Additional embodiments are disclosed herein.

A fifth inventive concept presented herein provides a diagnostic apparatus for a powder coating material pump. In an embodiment, the powder coating material pump may include a pinch valve and an air permeable member; and the diagnostic apparatus includes a diagnostic device comprising at least one detector to detect a characteristic of air flow through the air permeable member, and a logic device to control operation of the pinch valve to open and close, and to control the air flow through the air permeable member. Additional embodiments are disclosed herein.

A sixth inventive concept presented herein provides a diagnostic apparatus for a powder coating material pump. In an embodiment, the apparatus comprises a housing having a diagnostic port for admitting air flow and at least one detector to detect a characteristic of the air flow admitted by the diagnostic port, the diagnostic port being connectable to an air flow passage of the pump. Additional embodiments are disclosed herein.

A seventh inventive concept presented herein provides a diagnostic method for detecting a fault in a powder coating material pump. In an embodiment, the method includes the steps of applying air pressure to a pressure chamber to close a pinch valve disposed in the pump, and detecting pressure or air flow or both to determine whether there is a leak associated with said pinch valve. Additional embodiments are disclosed herein.

An eighth inventive concept present herein provides a diagnostic method for detecting a fault in a powder coating material pump. In an embodiment, the diagnostic method includes the steps of applying air pressure to a pressure chamber in the pump having an air permeable filter member disposed therein, and detecting pressure or air flow or both to determine air flow through the air permeable filter member. Additional embodiments are disclosed herein.

These and other inventive concepts and embodiments as well as additional aspects and advantages of the inventions disclosed herein will be apparent to those skilled in the art from the following description of the exemplary embodiments in view of the accompanying drawings.

BRIEF DESCRIPTION OF THE DRAWINGS

FIGS. 2A-2C are assembled and exploded isometric views of a pump in accordance with the inventions;

FIGS. 2D-2G are elevation and cross-sectional views of the assembled pump of FIG. 2A;

FIG. 7 is an exploded perspective of a supply manifold;

FIG. 8 is an exemplary embodiment of a pneumatic flow arrangement for the pump of FIG. 2A;

FIGS. 9A and 9B are an isometric and exploded isometric of a transfer pump in accordance with the inventions;

FIG. 10 is an exemplary embodiment of a pneumatic flow arrangement for a transfer pump;

FIG. 16A-16D is an exemplary logic table of valve and solenoid status for exemplary diagnostic tests according with the teachings herein;

DETAILED DESCRIPTION OF THE INVENTIONS AND EXEMPLARY EMBODIMENTS THEREOF

Figure 1:
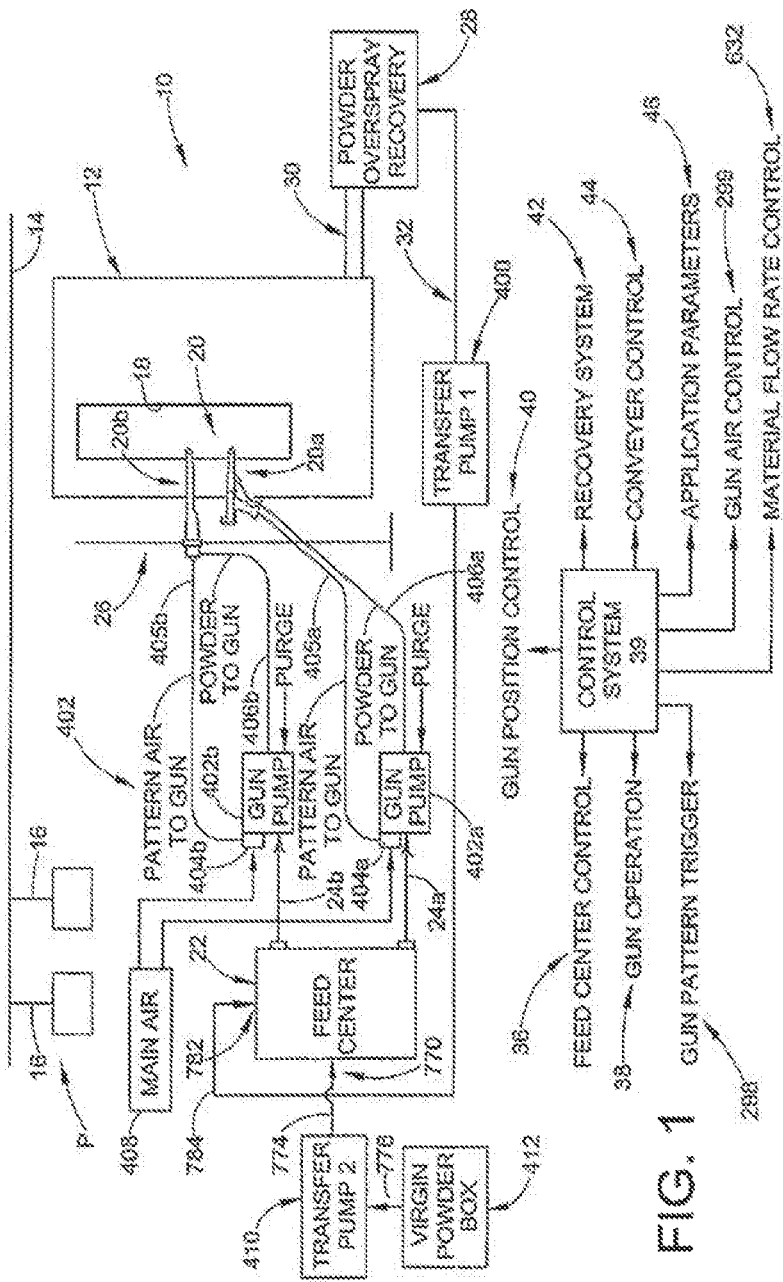
FIG. 1 is a simplified schematic diagram of a powder coating material application system utilizing the present inventions.

The disclosure and teachings herein contemplate a diagnostic apparatus for a powder coating material pump. An embodiment of a powder coating material pump is a dense phase pump for particulate material. The pump may be used in combination with any number or type of spray applicator devices or spray guns, powder coating spray booths, powder coating material application system controls, and powder coating material supply. We use the term pump as a short hand reference to a powder coating material pump embodiment, but we also intend that the term pump as used herein may alternatively include a pump design that is used for materials other than powder coating material.

While the exemplary embodiments illustrate a powder coating material pump (herein also referred to as "pump") that utilizes two pump chambers and associated control devices, for example, four pneumatic pinch valves and two air permeable filter members, the inventions are not limited to such pump designs. The diagnostic apparatuses and methods described herein may be used with a pump having a single pump chamber and a single pneumatic pinch valve, or more than two pump chambers and more or less than four control devices.

Reference herein to fluid pressure is relative to atmospheric or ambient conditions of the surrounding environment external the pump, and includes the terms suction, vacuum or negative pressure for admitting or drawing powder coating material into a pump chamber; and the terms delivery or positive pressure for discharging or pushing powder coating material out of the pump chamber. In the exemplary embodiments, the fluid may be ordinary air and hereinafter the exemplary embodiments refer to air pressure and air flow. Air pressure may be detected under static conditions (looking to measure the air pressure present in a volume) or may be detected under time based conditions (looking to measure the rate of pressure build-up or decay over time in a volume). Reference herein to detecting air flow means detecting air flow rate and we use the terms interchangeably herein. Although the exemplary embodiments describe the use of air as the fluid medium to convey powder coating material through the pump, other gases may be used, and so reference to "air" herein is intended to include alternative conveyance gases and fluids if so needed in particular applications. Although the exemplary embodiments describe a material application system that uses powder coating material, such as powder paint for example, the disclosure and inventions herein are not limited to powder coating materials, but may alternatively be used for other particulate powder materials that are compatible with a particular pump design. Therefore, although the term powder may be used herein for convenience as a short hand reference to powder coating material for the exemplary embodiments, we intend that the word powder, and the inventions in general, broadly include any particulate material or dry particulate powder or material.

Before describing an exemplary pump, it should be noted that the diagnostic apparatus and methods described hereinafter may be of two general categories but not by way of limitation. The first is to detect air flow through one or more air permeable filter members to detect whether the members are obstructed or losing porosity. The second is to detect air pressure and/or air flow to detect whether one or more pneumatic pinch valves are leaking or are exhibiting other fault conditions. A third category is an alternative embodiment in which air seals within the pump can be tested for leaks. The exemplary embodiment of the third category tests the overall air seal integrity of the pump as to whether a leak exists somewhere internal to the pump separate and apart from the pinch valves.

Additionally, we describe two basic embodiments of an interface configuration between a diagnostic apparatus and a pump. In a first configuration, we refer to an external diagnostic apparatus, meaning that the diagnostic apparatus interfaces pneumatically with the pump via the pump inlet port, the pump outlet port, or both. By both we do not imply nor require simultaneity, although that is one option. By interfacing with both the pump inlet port and the pump outlet port we mean that some diagnostic tests may be carried out using the inlet port and others using the outlet port and may be done at different times. Or all may be done with one port or the other. In another configuration, we refer to an on-board diagnostic apparatus, meaning that some or all of the diagnostic components are either integrated with the pump, the pneumatic or air supply manifold 404 for the pump, or both. In other words, in the on-board version, the diagnostics may be executed with one or more diagnostic detectors that interface with air passages of the pump, and/or the supply manifold 404 other than a connection with the pump inlet port or the pump outlet port. In the exemplary embodiments herein, the air passages of the pump and/or supply manifold that are utilized may be air passages such that the diagnostic detectors are in-line with pressure chambers for the pinch valves and/or in-line with a respective pinch valve powder flow path.

By-in-line is meant that a diagnostic detector is positioned in pneumatic communication with another component so as to form a common or shared part of an air passage through the detector and the component. For example, a flow detector may be in-line with a pinch valve in the sense that air flow through the detector also passes through the powder flow path portion of the pinch valve. As another example, a flow detector may be in-line with a pinch valve in the sense that air flow through the flow detector also passes to a pinch valve pressure chamber. As another example, a flow detector may be in-line with a pump pressure chamber for an air permeable filter member in the sense that air flow through the detector also passes through the filter member. Other examples will be apparent from FIG. 15. The reference to in-line in the context of air flow does not imply or mean that the parts are physically along a straight line, but rather refers to the associated air flow paths.

By "dense phase" is meant that the conveyance air that is present in the particulate flow is about the same as the amount of air used to fluidize the material at the supply such as a feed hopper. As used herein, "dense phase" and "high density" are used to convey the same idea of a low air volume mode of material flow in a pneumatic conveying system where not all of the material particles are carried in suspension. In such a dense phase system, the material is forced along a powder flow path by significantly less conveyance air volume as compared to a conventional dilute phase system, with the material flowing more in the nature of plugs that push each other along the flow path, somewhat analogous to pushing the plugs as a piston through the powder flow path. The lower conveyance air volume means that smaller diameter powder flow paths may be used. With smaller cross-sectional flow paths this movement can be effected under lower pressures.

In contrast, a dilute phase is a mode of material flow in a pneumatic conveying system where all the particles are carried in suspension. Conventional flow systems introduce a significant quantity of conveyance air into the flow stream in order to pump the material from a supply and push it through under positive pressure to the spray application devices. For example, most conventional powder coating spray systems utilize venturi pumps to draw fluidized powder from a supply into the pump. A venturi pump by design adds a significant amount of conveyance air to the powder stream. Typically, flow air and atomizing air are added to the powder to push the powder under positive pressure through a feed hose and an applicator device. Thus, in a conventional powder coating spray system, the powder is entrained in a high velocity high volume flow of air, thus necessitating large diameter powder flow passageways in order to attain usable powder flow rates.

Dense phase flow is oftentimes used in connection with the transfer of material to a closed vessel under high pressure. The present inventions, in being directed to material application rather than just transport or transfer of material, contemplate flow at substantially lower pressure and flow rates as compared to dilute phase transfer under high pressure to a closed vessel. However, the inventions also contemplate a dense phase transfer pump embodiment which can be used to transfer material to an open or closed vessel.

As compared to conventional dilute phase systems having air volume flow rates of about 3 to about 6 cfm (such as with a venturi pump arrangement, for example), the exemplary pump may operate at about 0.8 to about 1.6 cfm, for example. Thus, in the exemplary pump, powder delivery rates may be on the order of about 150 to about 300 grams per minute. These values are intended to be exemplary and not limiting. Pumps in accordance with the present inventions can be designed to operate at lower or higher air flow and material delivery values.

Dense phase versus dilute phase flow can also be thought of as rich versus lean concentration of material in the air stream, such that the ratio of material to air is much higher in a dense phase system. In other words, in a dense phase system the same amount of material per unit time is transiting a flow path cross-section (of a tube for example) of lesser area as compared to a dilute phase flow. For example, the cross-sectional area of a powder feed tube is about one-fourth the area of a feed tube for a conventional venturi type system. For comparable flow of material per unit time then, the material is about four times denser in the air stream as compared to conventional dilute phase systems.

With reference to FIG. 1, in an embodiment, a material application system, such as, for example, a typical powder coating spray system is designated with the numeral 10. Such an arrangement commonly includes a powder spray booth 12 in which an object or part P is to be sprayed with a powder coating material. The application of powder to the part P is generally referred to herein as a powder spray, coating or application operation procedure or process, however, there may be any number of control functions, steps and parameters that are controlled and executed before, during and after powder is actually applied to the part.

As is known, the part P is suspended from an overhead conveyor 14 using hangers 16 or any other conveniently suitable arrangements. The booth 12 includes one or more openings 18 through which one or more spray applicators 20 may be used to apply powder coating material to the part P as it travels through the booth 12. The applicators 20 may be of any number depending on the particular design of the overall system 10. Each applicator 20 may be a manually operated device as with device 20a, or a system controlled device, referred to herein as an automatic applicator 20b, wherein the term "automatic" simply refers to the fact that an automatic applicator may be mounted on a support and is triggered on and off by a control system, rather than being manually supported and manually triggered. The present inventions are directed to powder coating material application systems that use manual and/or automatic spray applicators.

It is common in the powder coating material application industry to refer to the powder applicators as powder spray guns, and with respect to the exemplary embodiments herein we will use the terms applicator and gun interchangeably. However, it is intended that the disclosure is applicable to material application devices other than powder spray guns, and hence the more general term applicator is used to convey the idea that the inventions can be used in many particulate material application systems other than the exemplary powder coating material application system described herein. The inventions are likewise applicable to systems that utilize electrostatic spray guns as well as non-electrostatic spray guns. The inventions are also not limited by functionality associated with the word "spray". Although the inventions are especially suited to powder spray application, the pump concepts and diagnostic systems and methods disclosed herein may find use with other material application techniques beyond just spraying, whether such techniques are referred to as dispensing, discharge, application or other terminology that might be used to describe a particular type of material application device.

The spray guns 20 receive powder from a supply or feed center such as a hopper 22 or other material supply through an associated powder feed or supply hose 24. The automatic guns 20b typically are mounted on a support 26. The support 26 may be a simple stationary structure, or may be a movable structure, such as an oscillator that can move the guns up and down during a spraying operation, or a gun mover or reciprocator that can move the guns in and out of the spray booth, or a combination thereof.

The spray booth 12 is designed to contain powder overspray within the booth, usually by a large flow of containment air into the booth. This air flow into the booth is usually effected by a powder overspray reclamation or recovery system 28. The recovery system 28 pulls air with entrained powder overspray from the booth, such as for example through a duct 30. In some systems the powder overspray is returned to the feed center 22 as represented by the return line 32. In other systems the powder overspray is either dumped or otherwise reclaimed in a separate receptacle.

In an embodiment, powder is transferred from the recovery system 28 back to the feed center 22 by a first transfer pump 400, an exemplary embodiment of which is described hereinafter. A respective gun pump 402 is used to supply powder from the feed center 22 to an associated spray applicator or gun 20. For example, a first gun pump 402a is used to provide dense phase powder flow to the manual gun 20a and a second gun pump 402b is used to provide dense phase powder flow to the automatic gun 20b. Exemplary embodiments of the gun pumps 402 are described hereinafter. The diagnostic systems disclosed herein may be used with the exemplary pumps disclosed herein or with different pump designs as required, with dense phase pumps being particularly useful with the diagnostic apparatus and methods disclosed herein.

Each gun pump 402 operates from pressurized gas such as ordinary air supplied to the spray gun 20 by a pneumatic supply manifold 404 (FIG. 7). The exemplary embodiments provide a pump and supply manifold arrangement by which the pump 402 is mounted to the supply manifold 404 (since two gun pumps are shown in FIG. 1 the respective supply manifolds are labeled 404a and 404b) with a gasket or other air seal device therebetween. This eliminates unnecessary plumbing between the supply manifold 404 and the pump 402. Although schematically illustrated in FIG. 1 as being directly joined, it is contemplated that in practice the supply manifolds 404a,b may be disposed in a cabinet or other enclosure and mounted to the pumps 402 with a wall of the cabinet therebetween. In this manner, the supply manifolds 404a,b, which may include electrical power such as solenoid valves, are isolated from the spraying environment.

The supply manifold 404 (also referred to herein as the pneumatic supply manifold or the air supply manifold) supplies pressurized air to an associated pump 402 for purposes that will be explained hereinafter. In addition, each supply manifold 404 may include a pressurized pattern air supply that is provided to the spray guns 20 via air hoses or lines 405. Main air 408 is provided to the supply manifold 404 from any convenient source within the manufacturing facility of the end user of the system 10. Each pump 402 supplies powder to its respective applicator 20 via a powder supply hose 406.

In the FIG. 1 embodiment, a second transfer pump 410 may be used to transfer powder from a supply 412 of virgin powder (that is to say, unused powder) to the feed center 22. Those skilled in the art will understand that the number of required transfer pumps 410 and gun pumps 402 will be determined by the requirements of the overall system 10 as well as the spraying operations to be performed using the system 10.

Although the gun pump and the transfer pumps may be the same design, in the exemplary embodiments there are differences that will be described hereinafter. Those differences take into account that the gun pump preferably provides a smooth consistent flow of powder material to the spray applicators 20 in order to provide the best coating onto the objects P, whereas the transfer pumps 400 and 410 may be used to move powder from one receptacle to another at a high enough flow rate and volume to keep up with the powder demand from the applicators and as optionally supplemented by the powder overspray collected by the recovery system 28. The diagnostics apparatuses and methods described herein are useful with either the gun pump, the transfer pump or both.

The exemplary embodiments of the pumps 400, 410 and 402, and the selected design and operation of the material application system 10, including the spray booth 12, the conveyor 14, the guns 20, the recovery system 28, and the feed center or supply 22, form no necessary part of the present inventions other than as may be used in combination with the diagnostic apparatus and methods disclosed herein, and may be selected based on the requirements of a particular coating application. A particular spray applicator, however, that is well suited for use with the present inventions is described in pending International patent application number PCT/US04/26887 for SPRAY APPLICATOR FOR PARTICULATE MATERIAL, filed on Aug. 18, 2004, and published as WO 2005/018823 A2 on Mar. 3, 2005, the entire disclosure of which is incorporated herein by reference. However, many other applicator designs may be used as required for a particular application. A control system 39 likewise may be a conventional control system such as a programmable processor based system or other suitable control circuit. The control system 39 executes a wide variety of control functions and algorithms, typically through the use of programmable logic and program/software routines, which are generally indicated in FIG. 1 as including but not necessarily limited to feed center control 36 (for example supply controls and pump operation controls), gun operation control 38 (such as for example, gun trigger controls), gun position control 40 (such as for example control functions for the reciprocator/gun mover 26 when used), powder recovery system control 42 (for example, control functions for cyclone separators, after filter blowers and so on), conveyor control 44 and material application parameter controls 46 (such as for example, powder flow rates, applied film thickness, electrostatic or non-electrostatic application and so on). The control system 39 functions as a logic device that preferably includes program logic by which the pneumatic control signals for the operation of the powder coating material pumps are generated. The logic device for the diagnostic apparatus and methods including instructions and controls for the pump operation may be realized as part of the control system 39 logic, or may separately interface with the control system 39, or still alternatively may separately be provided by a different control system having the control logic used to run a pump for diagnostic tests. Conventional control system theory, design and programming may be utilized for all the electronic control functions and logic described herein.

While the described embodiments herein are presented in the context of a dense phase pump for use in a powder coating material application system, those skilled in the art will readily appreciate that the present inventions may be used in many different dry particulate material application systems, including but not limited in any manner to: talc on tires, super-absorbents such as for diapers, food related material such as flour, sugar, salt and so on, desiccants, release agents, and pharmaceuticals. These examples are intended to illustrate the broad application of the inventions for application of particulate material to objects. The specific design and operation of the material application system selected provides no limitation on the present inventions except as otherwise expressly noted herein.

Figure 2B:
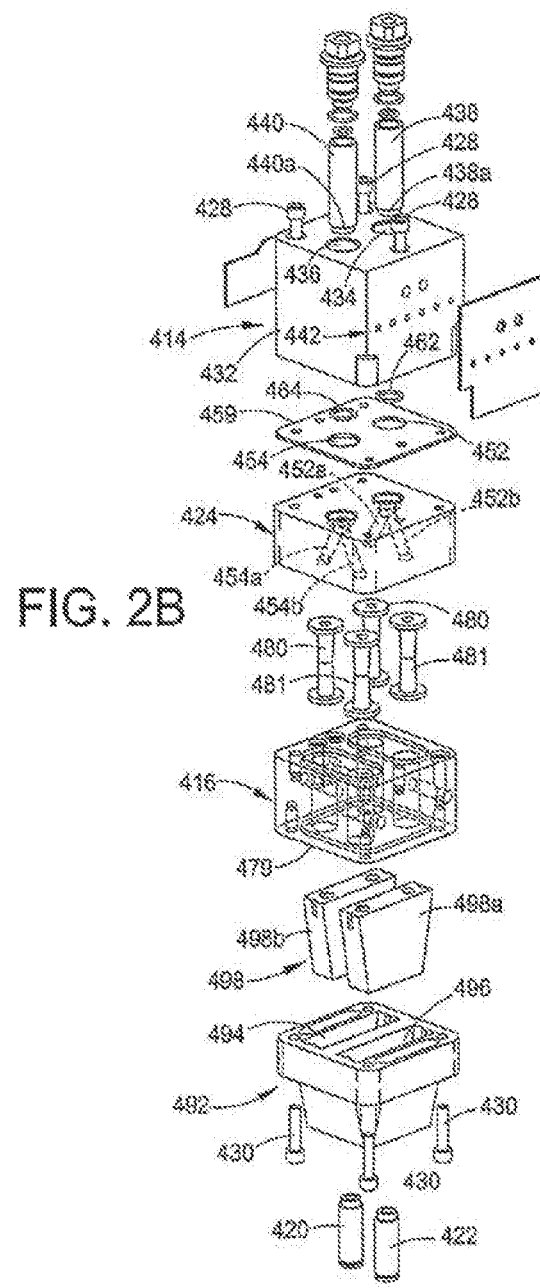
Figure 2G:
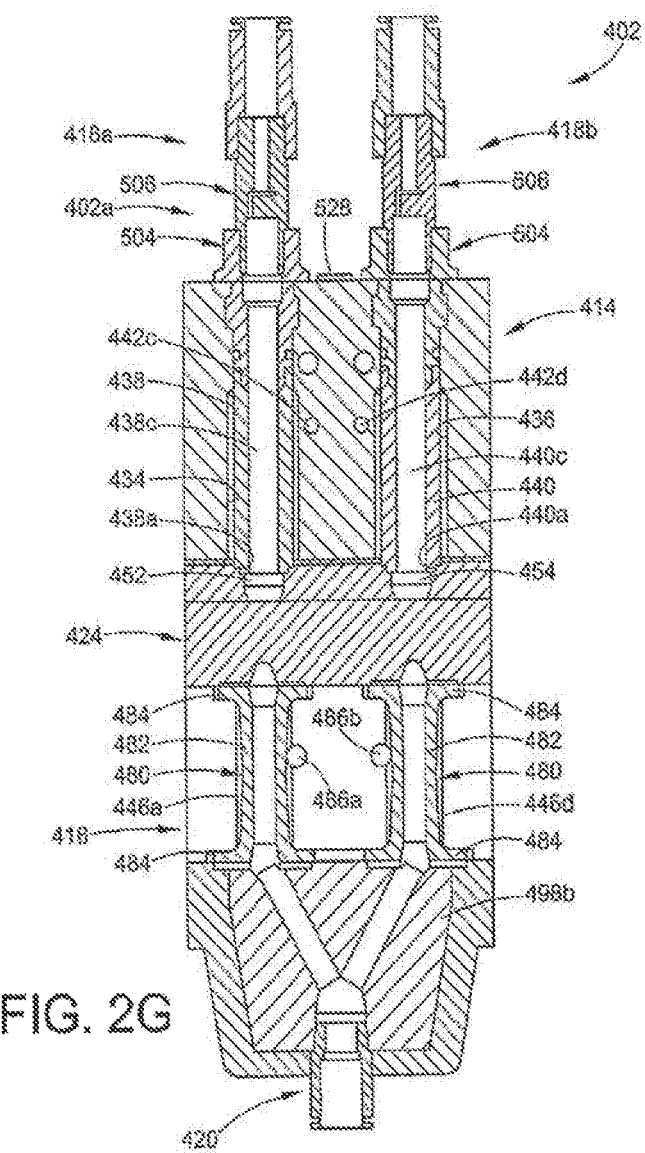
Figure 3A:
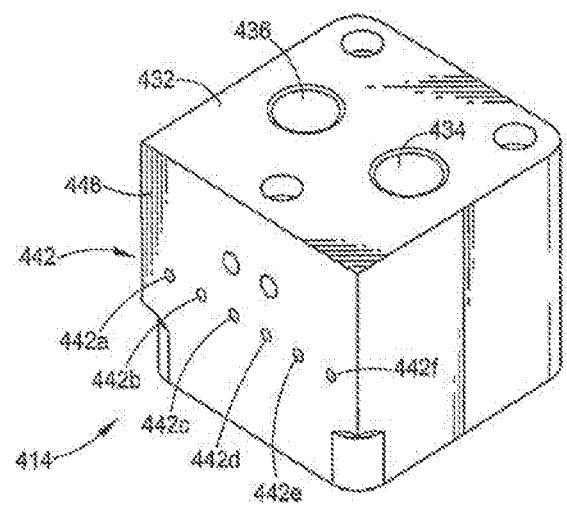
FIGS. 3A and 3B are an isometric and upper plan view of a pump manifold.
Figure 3B:
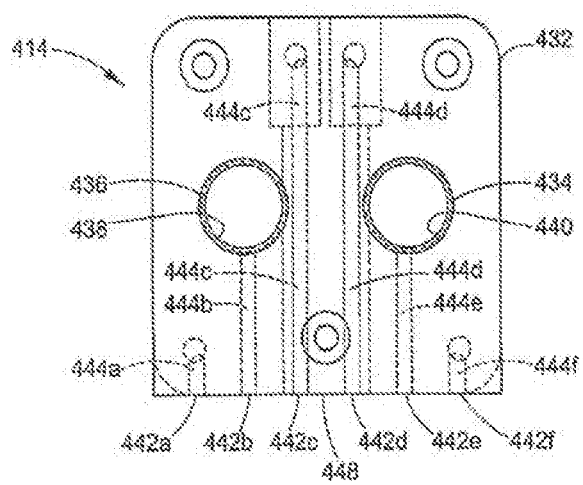

With reference to FIGS. 2A, 2B and 2C there is illustrated an exemplary embodiment of a dense phase pump 402 suitable for use with the present inventions. Although the pump 402 can be used as a transfer pump as well, it is particularly designed as a gun pump for supplying material to the spray applicators 20. The gun pumps 402 and transfer pumps 400 and 410 share many common design features which will be readily apparent from the detailed descriptions herein.

The pump 402 is preferably although need not be modular in design. The modular construction of the pump 402 is realized with a pump manifold body 414 and a valve body 416. The pump manifold body 414 houses a pair of pump chambers along with a number of air passages as will be further explained herein. The valve body 416 houses a plurality of valve elements as will also be explained herein. The valve elements respond to air pressure signals that are communicated into the valve body 416 from the pump manifold body 414. Although the exemplary embodiments herein illustrate the use of valve elements that may be realized in the form of pneumatic pinch valves, those skilled in the art will readily appreciate that various aspects and advantages of the present inventions can be realized with the use of other control valve designs other than pneumatic pinch valves. A pneumatic pinch valve is a pinch valve that is disposed in a pinch valve pressure chamber and that provides a flow-through passage, such as for the powder coating material, and that is pinched closed by the compressive force of air pressure acting on the pinch valve body. The pinch valve opens for flow in response to removal of the air pressure from the pinch valve pressure chamber, wherein the pinch valve typically is made of elastic material so as to return to a natural or relaxed condition in which the pinch valve is open. The opening of the pinch valve may also be facilitated alternatively by the application of negative pressure in the pinch valve pressure chamber.

The upper portion 402a of the pump may be adapted for purge air arrangements 418a and 418b, and the lower portion 402b of the pump may be adapted for a pump inlet 420 and a pump outlet 422. A powder feed hose 24 (FIG. 1) is connected to the pump inlet 420 to supply a flow of powder from a supply such as the feed hopper 22. A powder supply hose 406 (FIG. 1) is used to connect the pump outlet 422 to a spray applicator 20 whether it be a manual or automatic spray gun positioned up at the spray booth 12. The powder supplied to the pump 402 may but need not be fluidized.

Powder uptake into and discharge out of the pump 402 thus occurs at a single end 402b of the pump. This allows a purge function 418 to be provided at the opposite end 402a of the pump thus providing an easier purging operation as will be further explained herein.

If there were only one pump chamber (which is a useable embodiment of the inventions) then the valve body 416 could be directly connected to the supply manifold 404 because there would only be the need for two powder paths (suction and delivery) through the pump. However, in order to produce a steady, consistent and adjustable flow of powder from the pump, two or more pump chambers may be provided. When two pump chambers are used, they are preferably operated out of phase so that as one pump chamber is receiving powder from the inlet the other pump chamber is supplying powder to the pump outlet. In this way, powder flows substantially continuously from the pump. With a single pump chamber this would not be the case because there is a gap in the powder flow stream from each individual pump chamber due to the need to first fill the pump chamber with powder. When more than two chambers are used, their timing can be adjusted as needed. In any case, it is preferred though not required that all pump chambers communicate with a single port at the pump inlet and a single port at the pump outlet.

It is preferred but not required that powder coating material admitted or flowing into and discharged out of each of the pump chambers is accomplished at a single end of the chamber. This provides an arrangement by which a straight through purge function can be used at an opposite end of the pump chamber. Since each pump chamber communicates with the same pump inlet and outlet in the exemplary embodiment, additional modular units are used to provide branched powder flow paths in the form of Y blocks.

A first Y-block 424 is interconnected between the pump manifold body 414 and the valve body 416. A second Y-block 426 forms the inlet/outlet end of the pump and is connected to the side of the valve body 416 that is opposite the first Y-block 424. A first set of bolts 428 are used to join the pump manifold body 414, first Y-block 424 and the valve body 416 together. A second set of bolts 430 are used to join the second Y-block 426 to the valve body 416. Thus the pump in FIG. 2A when fully assembled is very compact and sturdy, yet the lower Y-block 426 can easily and separately be removed for replacement of powder flow path wear parts without complete disassembly of the pump. The first Y-block 424 provides a two branch powder flow path away from each pump chamber. One branch from each pump chamber communicates with the pump inlet 420 through the valve body 416 and the other branch from each chamber communicates with the pump outlet 422 through the valve body 416. The second Y-block 426 is used to combine the common powder flow paths in the valve body 416 from the pump inlet 420 to the pump outlet 422 of the pump. In this manner, each pump chamber communicates with the pump inlet through a control valve and with the pump outlet through another control valve. Thus, in the exemplary embodiment, there are four control valves, preferably in the form of pneumatic pinch valves, in the valve body that control flow of powder into and out of the pump chambers.

We use the designators 420 and 422 for the pump inlet and the pump outlet respectively. The pump inlet and pump outlet may be realized in the form of a pump inlet port and a pump outlet port, and, therefore, we use the same reference numeral 420 to refer to the pump inlet or pump inlet port and 422 to refer to the pump outlet or pump outlet port.

The pump manifold 414 is shown in detail in FIGS. 2B, 2E, 2G, 3A and 3B. The pump manifold 414 includes a pump manifold body 432 having first and second bores therethrough 434, 436 respectively. Each of these bores 434, 436 receives a generally cylindrical gas permeable filter member 438 and 440 respectively (also referred to herein as filter members for short). The gas permeable filter members 438, 440 include lower reduced outside diameter ends 438*a* and 440*a* which insert into a counterbore inside the first Y-block 424 (FIG. 4B) which helps to maintain the filter members 438, 440 aligned and stable. The upper ends of the filter members 438, 440 preferably abut the bottom ends of purge air fittings 504 with appropriate air seals as required. The filter members 438, 440 each define an interior volume (438*c*, 440*c*) that serves as a powder pump chamber so that there are two powder pump chambers provided in this embodiment. Therefore, we use terms filter member and pump chamber interchangeably herein because the filter members 438, 440 each define an interior volume that is a pump chamber. A portion of the bores 434, 436 are adapted to receive the purge air arrangements 418*a* and 418*b* as will be described hereinafter.

The filter members 438, 440 may be identical and each allows a gas, such as ordinary air, to pass through the cylindrical wall of the filter member but not powder. The filter members 438, 440 may be made of porous polyethylene, for example. This material is commonly used for fluidizing plates in powder feed hoppers. An exemplary material has about a 40 micron opening size and about a 40-50% porosity. Such material is commercially available from Genpore or Poron. Other porous materials may be used as needed. The filter members 438, 440 each have a diameter that is less than the diameter of its associated bore 434, 436 so that a small annular space is provided between the wall of the bore 434, 436 and the wall of the filter member 438, 440 (see FIGS. 2E, 2G). This annular space serves as a pneumatic pump pressure chamber. When a pump pressure chamber has negative or suction pressure applied to it, powder is drawn up into the powder pump chamber (438*c*, 440*c*) and when positive or delivery pressure is applied to the pump pressure chamber the powder in the powder pump chamber (438*c*, 440*c*) is forced out.

The pump manifold body 432 includes a series of six air inlet orifices 442. These orifices 442 are used to input pneumatic energy or signals into the pump. Four of the orifices 442*a*, *c*, *d* and *f* are in fluid communication via respective air passages 444*a*, *c*, *d* and *f* with a respective pinch valve pressure chamber 446 in the valve block 416 and thus are used to provide positive pressurized valve actuation air as will be explained hereinafter. Note that the air passages 444 may extend horizontally from the pump manifold surface 448 into the pump manifold body 432 and then extend vertically downward to the bottom surface of the pump manifold body 432 where they communicate with respective vertical air passages through the upper Y-block 424 and the valve body 416 wherein they join to respective horizontal air passages in the valve body 416 to open into each respective pinch valve pressure chamber 446. Air filters (not shown) may be included in these air passages to prevent powder from flowing up into the pump manifold 414 and the supply manifold 404 in the event that a pinch valve element or air seal should become compromised. The remaining two orifices, 442*b* and 442*e* are respectively in fluid communication with the bores 434, 436 via air passages 444*b* and 444*e*. These orifices 442*b* and 442*e* are thus used to provide positive or delivery pressure and negative or suction pressure to the pump pressure chambers in the manifold body 432.

The orifices 442 are preferably, although need not be, formed in a single planar surface 448 of the pump manifold body 432. The air supply manifold 404 includes a corresponding set of orifices that align with the pump manifold body orifices 442 and are in fluid communication therewith when the supply manifold 404 is mounted on the pump manifold 414. In this manner, the supply manifold 404 can supply all required air for the pinch valves and the pump chambers through a simple planar interface. An air seal gasket 450 is compressed between the faces of the pump manifold 414 and the supply manifold 404 to provide fluid tight air seals between the aligned orifices. Because of the volume, pressure and velocity desired for purge air, preferably separate purge air connections are used between the supply manifold and the pump manifold. Although the planar interface between the two manifolds is preferred it is not required, and individual connections for each pneumatic input to the pump from the supply manifold 404 could be used as required. The planar interface allows for the supply manifold 404, which in some embodiments includes electrical solenoids, to be placed inside a cabinet with the pump on the outside of the cabinet (mounted to the supply manifold through an opening in a cabinet wall) so as to help isolate electrical energy from the overall system 10. It is noted in passing that the pump 402 need not be mounted in any particular orientation during use.

Figure 4A:
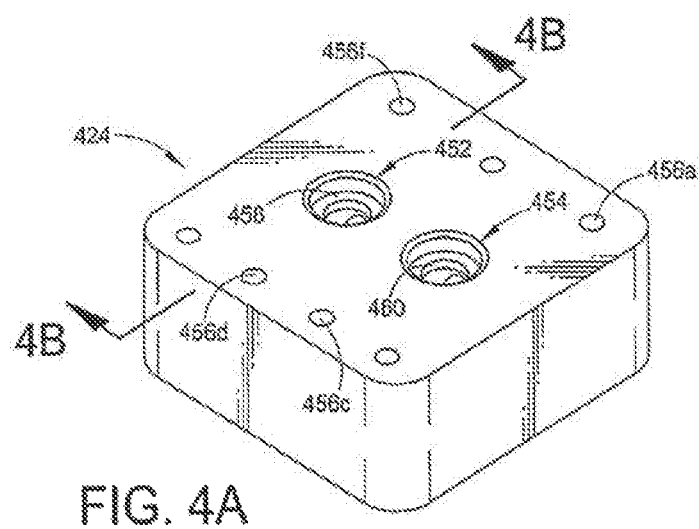
FIGS. 4A and 4B illustrate a first Y-block.
Figure 4B:
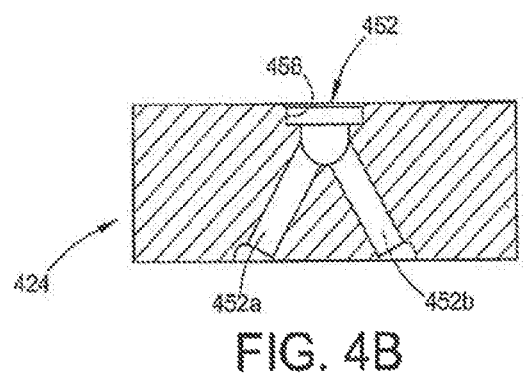

With reference to FIGS. 4A and 4B, the first Y-block 424 includes first and second ports 452, 454 that align with their respective pump chamber 434, 436. Each of the ports 452, 454 communicates with two branches 452*a*, 452*b* and 454*a*, 454*b* respectively (FIG. 4B only shows the branches for the port 452). Thus, the port 452 communicates with branches 452*a* and 452*b*. Therefore, there are a total of four branches in the first Y-block 424 wherein two of the branches communicate with one pressure chamber and the other two communicate with the other pressure chamber. The branches 452*a*, *b* and 454*a*, *b* form part of the powder path through the pump for the two pump chambers. Flow of powder through each of the four branches is controlled by a separate pinch valve in the valve body 416 as will be described herein. Note that the Y-block 424 also includes four through air passages 456*a*, *c*, *d*, *f* which are in fluid communication with the air passages 444*a*, *c*, *d* and *f* respectively in the pump manifold body 414. A gasket 459 may be used to provide fluid tight connection between the pump manifold body 414 and the first Y-block 424.

The ports 452 and 454 each include a counterbore 458, 460 which receive air seals 462, 464 (FIG. 2C) such as conventional o-rings. These air seals provide a fluid tight air seal between the lower ends of the filter members 438, 440 and the Y-block ports 452, 454. They also allow for slight tolerance variations so that the filter members 438, 440 are held tightly in place.

Figure 5A:
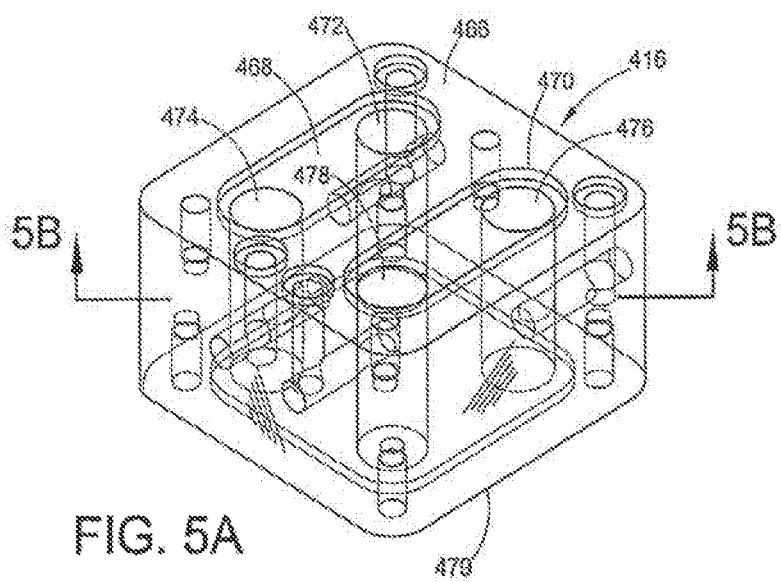
FIGS. 5A and 5B are perspective and cross-sectional views of a valve body.
Figure 5B:
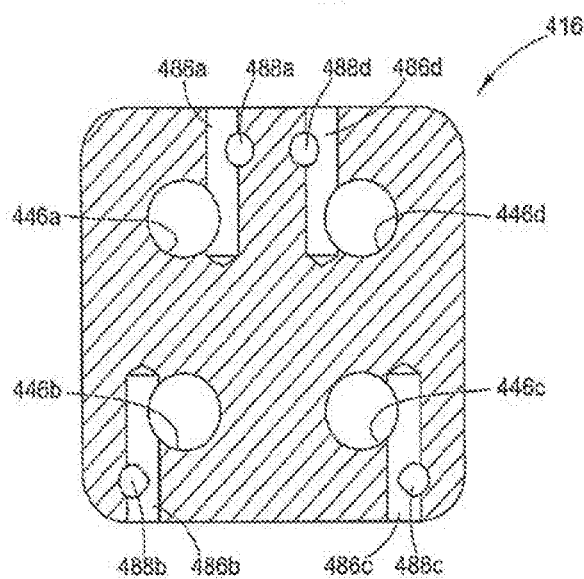

With additional reference to FIGS. 5A and 5B, the valve body 416 includes four through bores 446*a*, 446*b*, 446*c* and 446*d* that function as pressure chambers for a corresponding number of pinch valves. The upper surface 466 of the valve body includes two recessed regions 468 and 470 each of which includes two ports, each port being formed by one end of a respective bore 446. In this embodiment, the first recessed portion 468 includes orifices 472 and 474 which are formed by their respective bores 446*b* and 446*a* respectively. Likewise, the second recessed portion 470 includes orifices 476 and 478 which are formed by their respective bores 446*d* and 446*c* respectively. Corresponding orifices are formed on the opposite side face 479 of the valve body 416.

Each of the pressure chambers 446*a*-*d* retains either an inlet or suction pinch valve element 480, or an outlet or delivery pinch valve 481. Each pinch valve element 480, 481 is a fairly soft flexible member made of a suitable material, such as for example, natural rubber, latex or silicone. Each valve element 480, 481 includes a central generally cylindrical body 482 and two flanged ends 484 of a wider diameter than the central body 482. The flanged ends function as air seals and are compressed about the bores 446*a*-*d* when the valve body 416 is sandwiched between the first Y-block 424 and the second Y-block 426. In this manner, each pinch valve defines a flow path for powder through the valve body 416 to a respective one of the branches 452, 454 in the first Y-block 424. Therefore, one pair of pinch valves (a suction valve and a delivery valve) communicates with one of the pump chambers (filter member 440) in the manifold body while the other pair of pinch valves communicates with the other pump chamber (filter member 438). There are two pinch valves per chamber because one pinch valve controls the flow of powder into the pump chamber (suction) and the other pinch valve controls the flow of powder out of the pump chamber (delivery). The outer diameter of each pinch valve central body portion 482 is less than the bore diameter of its respect pressure chamber 446. This leaves an annular space surrounding each pinch valve that functions as the pressure chamber for that valve.

The valve body 416 includes air passages 486*a*-*d* that communicate respectively with the four pressure chamber bores 446*a*-*d*. as illustrated in FIG. 5B. These air passages 486*a*-*d* include vertical extensions (as viewed in FIG. 5B) 488*a*-*d*. These four air passage extensions 488*a*, *b*, *c*, *d* respectively are in fluid communication with the vertical portions of the four air passages 444*d*, *f*, *a*, *c* in the pump manifold 414 and the vertical passages 456*d*, *f*, *a*, *c* in the upper Y-block 424. Seals 490 are provided for air tight connections.

In this manner, each of the pressure chambers 446 in the valve body 416 is in fluid communication with a respective one of the air orifices 442 in the pump manifold 414, all through internal passages through the manifold body, the first Y-block and the valve body. When positive air pressure is received from the supply manifold 404 (FIG. 1) into the pump manifold 414, the corresponding valve 480, 481 is closed by the force of the air pressure acting against the outer flexible surface of the flexible valve body. The valves open due to their own resilience and elasticity when external air pressure in the pressure chamber is removed. This true pneumatic actuation avoids any mechanical actuation or other control member being used to open and close the pinch valves which is a significant improvement over the conventional designs. Each of the four pinch valves 480, 481 is preferably separately controlled for the gun pump 402.

In accordance with another aspect of the inventions, the valve body 416 is preferably made of a sufficiently transparent material so that an operator can visually observe the opening and closing of the pinch valves therein. A suitable material is acrylic but other transparent materials may be used. The ability to view the pinch valves also gives a good visual indication of a pinch valve failure since powder will be visible.

Figure 6A:
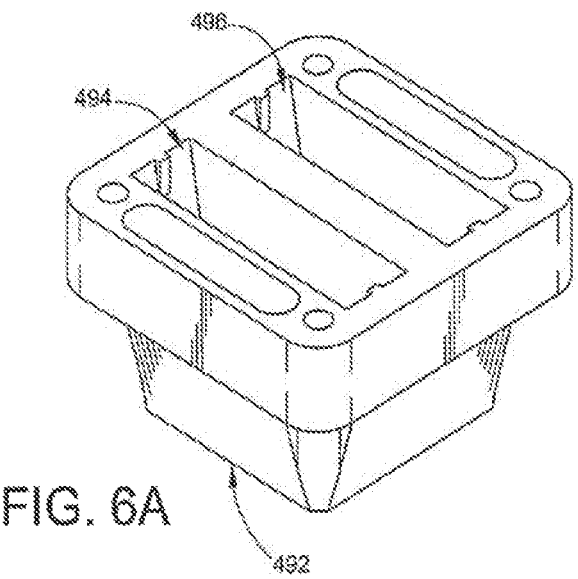
FIGS. 6A and 6B illustrate in perspective another Y-block arrangement.
Figure 6B:
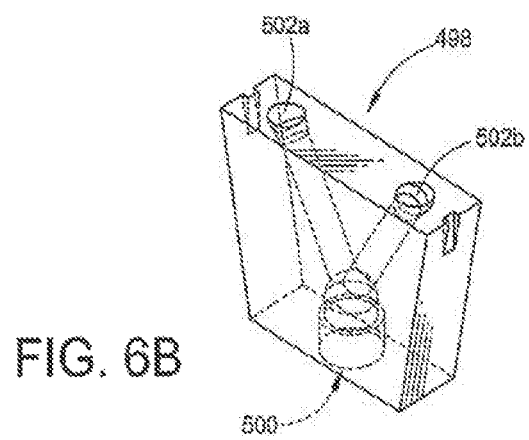

With additional reference to FIGS. 6A and 6B, the remaining part of the pump is the inlet end 402*b* formed by a second Y-block end body 492. The end body 492 includes first and second recesses 494, 496 each of which is adapted to receive a Y-block 498*a* and 498*b*. One of the Y-blocks is used for powder inlet and the other is used for powder outlet. Each Y-block 498 is a wear component due to exposure of its internal surfaces to powder flow. Since the body 492 is simply bolted to the valve body 416, it is a simple matter to replace the wear parts by removing the body 492, thus avoiding having to disassemble the rest of the pump.

Each Y-block 498 includes a lower port 500 that is adapted to receive a fitting or other suitable hose connector that may serve as the pump inlet and pump outlet ports 420, 422 (FIG. 2A) with one fitting connected to a hose 24 that runs to a powder supply and another hose 406 to a spray applicator such as a spray gun 20 (FIG. 1). Each Y-block includes two powder path branches 502*a*, 502*b*, 502*c* and 502*d* that extend away from the port 500. Each powder path in the second Y-blocks 498 are in fluid communication with a respective one of the pinch valves 480, 481 in the pinch valve body 416. Thus, powder that enters the pump at the pump inlet port 420 branches through a first of the two lower Y-blocks 498 into two of the pinch valves and from there to the pump chambers. Likewise, powder from the two pump chambers recombine from the other two pinch valves into a single pump outlet port 422 by way of the other lower Y-block 498.

The powder flow paths are as follows. Powder enters through a common powder port inlet 420 and branches via paths 502*a* or 502*b* in the lower Y-block 498*b* to the two inlet or suction pinch valves 480. Each of the inlet pinch valves 480 is connected to a respective one of the powder pump chambers 434, 436 via a respective one branch 452, 454 of a respective path through the first or upper Y-block 424. Each of the other branches 452, 454 of the upper Y-block 424 receive powder from a respective pump chamber, with the powder flowing through the first Y-block 424 to the two outlet or delivery pinch valves 481. Each of the outlet pinch valves 481 is also connected to a respect one of the branches 502 in the lower Y-block 498*a* wherein the powder from both pump chambers is recombined to the single pump outlet port 422. For the diagnostic concepts presented later herein, these powder flow paths are air flow paths (when powder is not being fed through the pump) that may be used for various pressure and air flow diagnostic tests as later described herein.

The pneumatic flow paths are as follows. When any of the pinch valves is to be closed, the supply manifold 404 issues a pressure increase at the respective orifice 442 in the pump manifold body 414. The increased air pressure flows through the respective air passage 442, 444 in the pump manifold body 414, down through the respective air passage 456 in the first Y-block 424 and into the respective air passage 486 in the valve body 416 to the appropriate pressure chamber 446. There may be many additional air passages or air flow paths within the pump as well as the supply manifold 404. Air seals, many of which have been described hereinabove, are used throughout the supply manifold 404 and the pump where ever two air passages need to be connected in an air-tight manner, so that when the pump is fully assembled, there are preferably no air leaks to ambient atmosphere outside the pump during normal operation. An exception is made for the pinch valve pressure chambers, which preferably are vented when the pinch valves are to be in an open condition.

It should be noted that a pump in accordance with the present disclosure provides for a proportional flow valve based on percent fill of the powder pump chambers, meaning that the flow rate of powder from the pump can be accurately controlled by controlling the open time of the pinch valves that feed powder to the pump chambers. This allows the pump cycle (i.e. the time duration for filling and emptying the pump chambers) to be short enough so that a smooth flow of powder is achieved independent of the flow rate, with the flow rate being separately controlled by operation of the pinch valves. Thus, flow rate can be adjusted entirely by control of the pinch valves without having to make any physical changes to the pump.

The purge function is greatly simplified because the pump provides a way for powder to enter and exit the pump chambers from a single end, so that the opposite end of the pump chamber can be used for purge air. With reference to FIGS. 2A, 2C, 2E and 2G, a purge air fitting 504 is inserted into the upper end of its respective pump chamber 438, 440. The fittings 504 receive respective check valves 506 that are arranged to only permit flow into the pump chambers 438, 440. The check valves 506 receive respective purge air hose fittings 508 to which a purge air hose can be connected. Purge air is supplied to the pump from the supply manifold 404 as will be described hereinbelow. The purge air thus can flow straight through the powder pump chambers and through the rest of the powder path inside the pump to very effectively purge the pump for a color change operation. No special connections or changes need to be made by the operator to effect this purging operation, thereby reducing cleaning time. Once the system 10 is installed, the purging function is always connected and available, thereby significantly reducing color change time because the purging function can be executed by the control system 39 without the operator having to make or break any powder or pneumatic connections with the pump.

Note from FIGS. 1 and 2A that with all four pinch valves 480, 481 in an open condition purge air will flow straight through the pump chambers, through the powder paths in the first Y-block 424, the pinch valves themselves 480, 481, the second Y-block 498 and out both the inlet 420 and the outlet 422. Purge air thus can be supplied throughout the pump and then on to the spray applicator to purge that device as well as to purge the feed hoses back to the powder supply 22. Thus, a dense phase pump concept is provided that allows forward and reverse purging.

With reference to FIG. 7, the supply manifold 404 illustrated is in essence a series of solenoid valves and air sources that control the flow of air to the pump 402. The particular arrangement illustrated in FIG. 7 is exemplary and not intended to be limiting. The supply of air to operate the pump 402 can be done without a manifold arrangement and in a wide variety of ways. The embodiment of FIG. 7 is provided as it is particularly useful for the planar interface arrangement with the pump, however, other manifold designs can also be used.

The supply manifold 404 includes a supply manifold body 510 that has a first planar face 512 that is mounted against the surface 448 of the pump manifold body 414 (FIG. 3A) as previously described herein. Thus the face 512 includes six orifices 514 that align with their respective orifices 442 in the pump manifold 414. The supply manifold body 510 is machined to have the appropriate number and location of air passages therein so that the proper air signals are delivered to the orifices 514 at the correct times. As such, the manifold further includes a series of valves that are used to control the flow of air to the orifices 514 as well as to control the purge air flow. Negative pressure is generated in the manifold 404 by use of a conventional venturi pump 518. System or shop air is provided to the manifold 404 via appropriate fittings 520. The details of the physical manifold arrangement are not necessary to understand and practice the present inventions since the manifold simply operates to provide air passages for air sources to operate the pump and can be implemented in a wide variety of ways. Rather, the details of note are described in the context of a schematic diagram of the pneumatic flow. It is noted at this time, however, that a separate control valve is provided for each of the pinch valves in the valve body 414 for purposes that will be described hereinafter.

With reference to FIG. 8, a pneumatic diagram is provided for a first embodiment. Main air 408 enters the supply manifold 404 and goes to a first regulator 532 to provide pump pressure source 534 to the pump chambers 438, 440, as well as pattern shaping air source 405 to the spray applicator 20 via air hose 406. Main air also is used as purge air source 536 under control of a purge air solenoid valve 538. Main air also goes to a second regulator 540 to produce venturi air pressure source 542 used to operate the venturi pump (to produce the negative pressure to the pump chambers 438, 440) and also to produce pinch air source 544 to operate the pinch valves 480, 481.

The use of the solenoid control valve 538 or other suitable control device for the purge air provides multiple purge capability. The first aspect is that two or more different purge air pressures and flows can be selected, thus allowing a soft and hard purge function. Other control arrangements besides a solenoid valve can be used to provide two or more purge air flow characteristics. The control system 39 selects soft or hard purge, or a manual input could be used for this selection. For a soft purge function, a lower purge air flow is supplied through the supply manifold 404 into the pump pressure chambers 434, 436 which is the annular space between the porous members 438, 440 and their respective bores 434, 436. The control system 39 further selects one set of pinch valves (suction or delivery) to open while the other set is closed. The purge air bleeds through the filter members 438, 440 and out the open valves to either purge the system forward to the spray gun 20 or reverse (backward) to the supply 22. The control system 39 then reverses which pinch valves are open and closed. Soft purge may also be done in both directions at the same time by opening all four pinch valves. Similarly, higher purge air pressure and flow may be used for a hard purge function forward, reverse or at the same time. The purge function carried out by bleeding air through the porous members 438, 440 also helps to remove powder that has been trapped by the porous members, thus extending the useful life of the porous members before they need to be replaced.

Hard or system purge can also be effected using the two purge arrangements 418a and 418b. High pressure flow air can be input through the purge air fittings 508 (the purge air can be provided from the supply manifold 404) and this air flows straight through the powder pump chambers defined in part by the porous members 438, 440 and out the pump. Again, the pinch valves 480, 481 can be selectively operated as desired to purge forward or reverse or at the same time.

It should be noted that the ability to optionally purge in only the forward or reverse direction provides a better purging capability because if purging can only be done in both directions at the same time, the purge air will flow through the path of least resistance whereby some of the powder path regions may not get adequately purged. For example, when trying to purge a spray applicator and a supply hopper, if the applicator is completely open to air flow, the purge air will tend to flow out the applicator and might not adequately purge the hopper or supply.

The pump therefore allows for the entire powder path from the supply to and through the spray guns to be purged separately or at the same time with virtually no operator action required. The optional soft purge may be useful to gently blow out residue powder from the flow path before hitting the powder path with hard purge air, thereby preventing impact fusion or other deleterious effects from a hard purge being performed first.

The positive air pressure 542 for the venturi enters a control solenoid valve 546 and from there goes to the venturi pump 518. The output 518a of the venturi pump is a negative pressure or partial vacuum that is connected to an inlet of two pump solenoid valves 548, 550. The pump valves 548 and 550 are used to control whether positive or negative pressure is applied to the pump chambers 438, 440. Additional inputs of the valves 548, 550 receive positive pressure air from a first servo valve 552 that receives pump pressure air 534. The outlets of the pump valves 548, 550 are connected to a respective one of the pump chambers through the air passage scheme described hereinabove. Note that the purge air 536 is schematically indicated as passing through the porous tubes 438, 440.

Thus, the pump solenoid valves 550 and 552 are used to control operation of the pump 402 by alternately applying positive and negative pressure to the pump chambers, typically but not necessarily 180° out of phase so that as one pump chamber is being pressurized the other pump chamber is under negative pressure and vice-versa. In this manner, one pump chamber is filling with powder while the other pump chamber is emptying. It should be noted that the pump chambers may or may not completely "fill" with powder. As will be explained herein, very low powder flow rates can be accurately controlled by use of the independent control valves for the pinch valves. That is, the pinch valves can be independently controlled apart from the cycle rate of the pump chambers to feed more or less powder into the chambers during each pumping cycle.

Pinch valve air 544 is input to four pinch valve control solenoids 554, 556, 558 and 560. Four valves are used so that there is preferably independent timing control of the operation of each of the four pinch valves 480, 481. In FIG. 8, "delivery pinch valve" refers to the two pinch valves 481 (also labeled B and C in FIG. 15) through which powder exits the pump chambers and "suction pinch valve" refers to the two pinch valves 480 (also labeled A and D in FIG. 15) through which powder is fed to the pump chambers. Though the same reference numeral is used, each suction pinch valve and each delivery pinch valve is separately controlled.

A first delivery solenoid valve 554 controls air pressure to a pinch valve pressure chamber 446b for a first delivery pinch valve 481; a second delivery solenoid valve 558 controls air pressure to a pinch valve pressure chamber 446c for a second delivery pinch valve 481; a first suction solenoid valve 556 controls air pressure to a pinch valve pressure chamber 446a for a first suction pinch valve 480; and a second suction solenoid valve 560 controls air pressure to a pinch valve pressure chamber 446d for a second suction pinch valve 480.

The pneumatic diagram of FIG. 8 thus illustrates the functional air flow that the manifold 404 produces in response to various control signals from the control system 39 (FIG. 1).

Figure 9B:
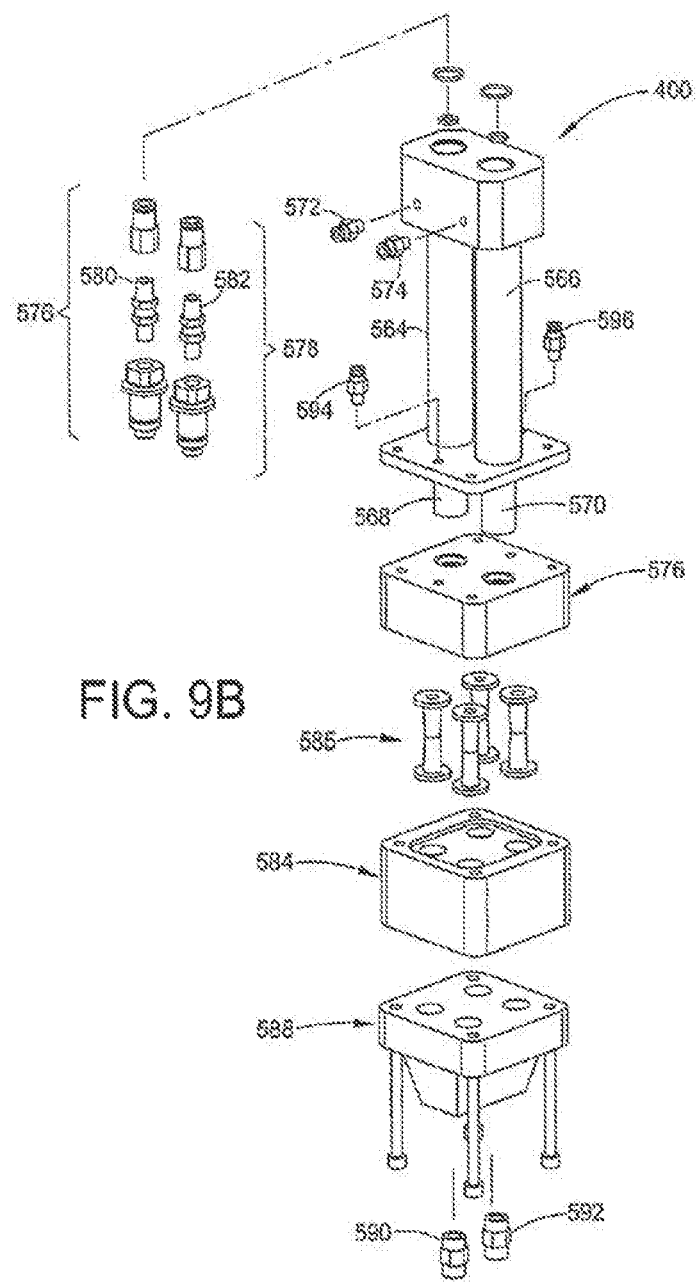

With reference to FIGS. 9A and 9B, a transfer pump 400 is also contemplated. Many aspects of the transfer pump are the same or similar to the spray applicator pump 402 and therefore need not be repeated in detail.

Although a gun pump 402 may be used as a transfer pump as well, a transfer pump is primarily used for moving larger amounts of powder between receptacles as quickly as needed. Moreover, although a transfer pump as described herein will not have the same four way independent pinch valve operation, a transfer valve may be operated with the same control process as the gun pump. For example, some applications require large amounts of material to be applied over large surfaces yet maintaining control of the finish. A transfer pump could be used as a pump for the applicators by also incorporating the four independent pinch valve control process described herein.

In the system of FIG. 1 a transfer pump 400 is used to move powder from the recovery system 28 (such as a cyclone) back to the feed center 22. A transfer pump 410 is also used to transfer virgin powder from a supply, such as a box, to the feed center 22. In such examples as well as others, the flow characteristics are not as important in a transfer pump because the powder flow is not being sent to a spray applicator.

In the transfer pump 400, to increase the powder flow rate larger pump chambers are needed. In the embodiment of FIGS. 9A and 9B, the pump manifold is now replaced with two extended tubular housings 564 and 566 which enclose lengthened porous tubes 568 and 570. The longer tubes 568, 570 can accommodate a greater amount of powder during each pump cycle. The porous tubes 568, 570 have a slightly smaller diameter than the housings 564, 566 so that an annular space is provided therebetween that serves as a pressure chamber for both positive and negative pressure. Air hose fittings 572 and 574 are provided to connect air hoses that are also connected to a source of positive and negative pressure at a transfer pump air supply system to be described hereinafter. Since a pump manifold is not being used, the pneumatic energy is individually plumbed into the pump 400.

The air hose fittings 572 and 574 are in fluid communication with the pressure chambers within the respective housings 564 and 566. In this manner, powder is drawn into and pushed out of the pump chambers 568, 570 by negative and positive pressure as in the gun pump design. Also similarly, purge port arrangements 576 and 578 are provided and function the same way as in the gun pump design, including check valves 580, 582.

A valve body 584 is provided that houses four pinch valves 585 which control the flow of powder into and out of the pump chambers 568 and 570 as in the gun pump design. As in the gun pump, the pinch valves are disposed in respective pressure chambers in the valve body 584 such that positive air pressure is used to close a valve and the valves open under their own resilience when the positive pressure is removed. A different pinch valve actuation scheme however is used as will be described shortly. An upper Y-block 586 and a lower Y-block 588 are also provided to provide branched powder flow paths as in the gun pump design. The lower Y-block 588 thus is also in communication with a powder inlet fitting 590 and a powder outlet fitting 592. Thus, powder in from the single inlet flows to both pump chambers 568, 570 through respective pinch valves and the upper Y-block 586, and powder out of the pump chambers 568, 570 flows through respective pinch valves to the single outlet 592. The branched powder flow paths are realized in a manner similar to the gun pump embodiment and need not be repeated herein. The transfer pump may also incorporate replaceable wear parts or inserts in the lower Y-block 588 as in the gun pump.

Again, since a pump manifold is not being used in the transfer pump, separate air inlets 594 and 596 are provided for operation of the pinch valves which are disposed in pressure chambers as in the gun pump design. Only two air inlets are needed even though there are four pinch valves for reasons set forth below. An end cap 598 may be used to hold the housings in alignment and provide a structure for the air fittings and purge fittings.

Because quantity of flow is of greater interest in the transfer pump than quality of the powder flow, individual control of all four pinch valves is not needed although it could alternatively be done. As such, pairs of the pinch valves can be actuated at the same time, coincident with the pump cycle rate. In other words, when the one pump chamber is filling with powder, the other is discharging powder, and respective pairs of the pinch valves are thus open and closed. The pinch valves can be actuated synchronously with actuation of positive and negative pressure to the pump chambers. Moreover, single air inlets to the pinch valve pressure chambers can be used by internally connecting respective pairs of the pressure chambers for the pinch valve pairs that operate together. Thus, two pinch valves are used as delivery valves for powder leaving the pump, and two pinch valves are used as suction valves for powder being drawing into the pump. However, because the pump chambers alternate delivery and suction, during each half cycle there is one suction pinch valve open and one delivery pinch valve open, each connected to different ones of the pump chambers. Therefore, internally the valve body 584 the pressure chamber of one of the suction pinch valves and the pressure chamber for one of the delivery pinch valves are connected together, and the pressure chambers of the other two pinch valves are also connected together. This is done for pinch valve pairs in which each pinch valve is connected to a different pump chamber. The interconnection can be accomplished by simply providing cross-passages within the valve body between the pair of pressure chambers.

With reference to FIG. 10, the pneumatic diagram for the transfer pump 400 is somewhat more simplified than for a pump that is used with a spray applicator. Main air 408 is input to a venturi pump 600 that is used to produce negative pressure for the transfer pump chambers. Main air also is input to a regulator 602 with delivery air being supplied to respective inputs to first and second chamber solenoid valves 604, 606. The chamber valves also receive as an input the negative pressure from the venturi pump 600. The solenoid valves 604, 606 have respective outputs 608, 610 that are in fluid communication with the respective pressure chambers of the transfer pump.

The solenoid valves in this embodiment are air actuated rather than electrically actuated. Thus, air signals 612 and 614 from a pneumatic timer or shuttle valve 616 are used to alternate the valves 604, 606 between positive and negative pressure outputs to the pressure chambers of the pump. An example of a suitable pneumatic timer or shuttle valve is model S9 568/68-1/4-SO available from Hoerbiger-Origa. As in the gun pump, the pump chambers alternate such that as one is filling the other is discharging. The shuttle timer signal 612 is also used to actuate a 4-way valve 618. Main air is reduced to a lower pressure by a regulator 620 to produce pinch air 622 for the transfer pump pinch valves. The pinch air 622 is delivered to the 4-way valve 618. The pinch air is coupled to the pinch valves 624 for the one pump chamber and 626 for the other pump chamber such that associated pairs are open and closed together during the same cycle times as the pump chambers. For example, when the delivery pinch valve 624a is open to the one pump chamber, the delivery pinch valve 626a for the other pump chamber is closed, while the suction pinch valve 624b is closed and the suction pinch valve 626b is open. The valves reverse during the second half of each pump cycle so that the pump chambers alternate as with the gun pump. Since the pinch valves operate on the same timing cycle as the pump chambers, a continuous flow of powder is achieved.

Figure 11:
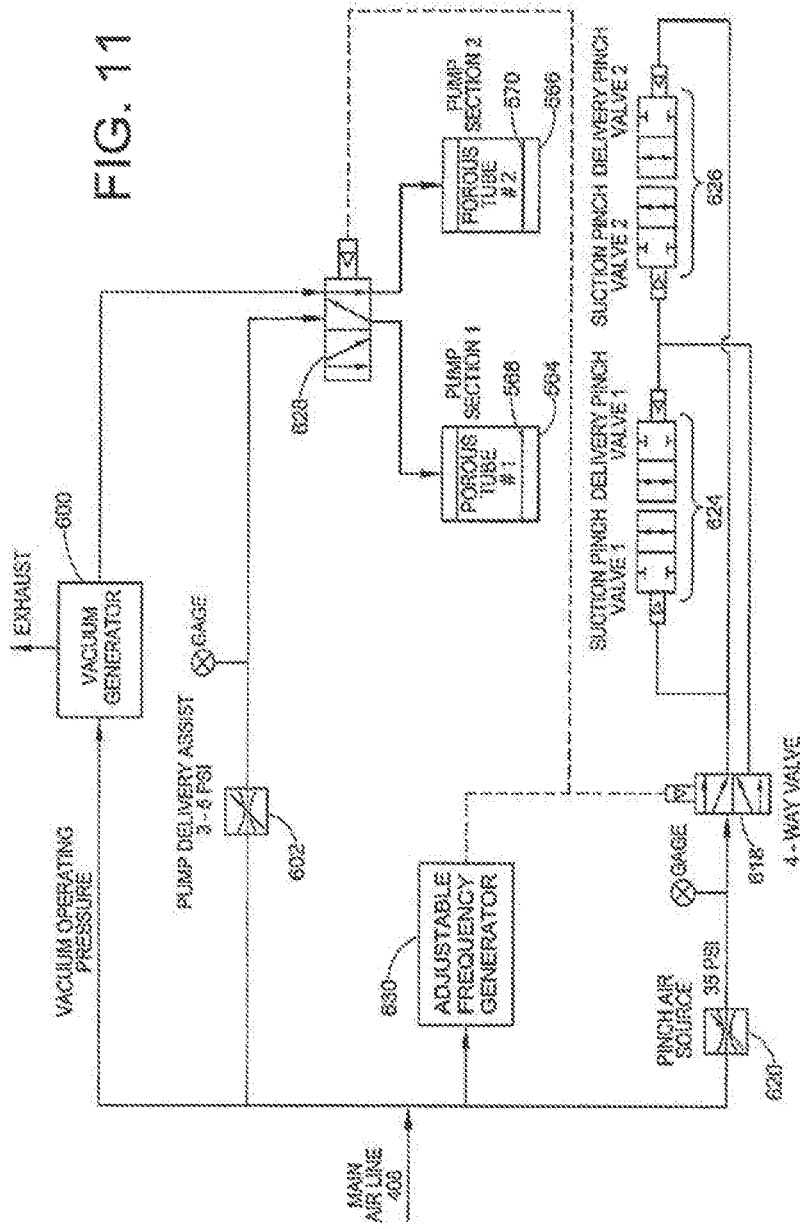
FIG. 11 is an alternative embodiment of a pneumatic circuit for the transfer pump.

FIG. 11 illustrates an alternative embodiment of the transfer pump pneumatic circuit. In this embodiment, the basic operation of the pump is the same, however, now a single valve 628 is used to alternate positive and negative pressure to the pump chambers. In this case, a pneumatic frequency generator 630 is used. A suitable device is model 81 506 490 available from Crouzet. The generator 630 produces a varying air signal that actuates the chamber 4-way valve 628 and the pinch air 4-way valve 618. As such, the alternating cycles of the pump chambers and the associated pinch valves is accomplished.

Figure 12:
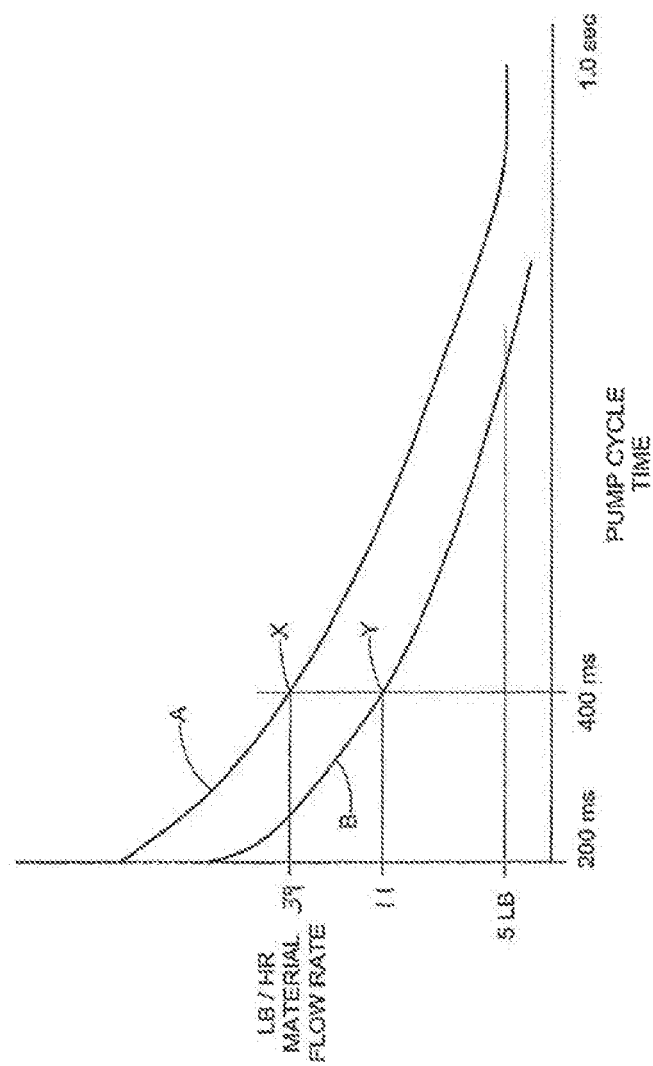
FIG. 12 is a representation of material flow rate curves for a pump operating in accordance with the inventions.

FIG. 12 illustrates a flow control aspect that is made possible by the independent control of the pinch valves 480, 481. This illustration is for explanation purposes and does not represent actual measured data, but a typical pump in accordance with the present invention will show a similar performance. The graph plots total flow rate in pounds per hour out of the pump versus pump cycle time. A typical pump cycle time of 400 milliseconds means that each pump chamber is filling or discharging during a 400 msec time window as a result of the application of negative and positive pressure to the pressure chambers that surround the porous members. Thus, each chamber fills and discharges during a total time of 800 msec. Graph A shows a typical response if the pinch valves are operated at the same time intervals as the pump chamber. This produces the maximum powder flow for a given cycle time. Thus, as the cycle time increases the amount of powder flow decreases because the pump is operating slower. Flow rate thus increases as the cycle time decreases because the actual time it takes to fill the pump chambers is much less than the pump cycle time. Thus there is a direct relationship between how fast or slow the pump is running (pump cycle time based on the time duration for applying negative and positive pressure to the pump pressure chambers) and the powder flow rate.

Graph B is significant because it illustrates that the powder flow rate, especially low flow rates, can be controlled and selected by changing the pinch valve cycle time relative to the pump cycle time. For example, by shortening the time that the suction pinch valves stay open, less powder will enter the pump chamber, no matter how long the pump chamber is in suction mode. In FIG. 12, for example, graph A shows that at pump cycle time of 400 msec, a flow rate of about 39 pounds per hour is achieved, as at point X. If the pinch valves however are closed in less than 400 msec time, the flow rated drops to point Y or about 11 pounds per hour, even though the pump cycle time remains at 400 msec. What this assures is a smooth consistent powder flow even at low flow rates. Smoother powder flow is effected by higher pump cycle rates, but as noted above this would also produce higher powder flow rates. So to achieve low powder flow rates but with smooth powder flow, the design allows control of the powder flow rate even for faster pump cycle rates, because of the ability to individually control operation of the suction pinch valves, and optionally the delivery pinch valves as well. An operator can easily change flow rate by simply entering in a desired rate. The control system 39 is programmed so that the desired flow rate is effected by an appropriate adjustment of the pinch valve open times. It is contemplated that the flow rate control is accurate enough that in effect this is an open loop flow rate control scheme, as opposed to a closed loop system that uses a sensor to measure actual flow rates. Empirical data can be collected for given overall system designs to measure flow rates at different pump cycle and pinch valve cycle times. This empirical data is then stored as recipes for material flow rates, meaning that if a particular flow rate is requested the control system will know what pinch valve cycle times will achieve that rate. Control of the flow rate, especially at low flow rates, is more accurate and produces a better, more uniform flow by adjusting the pinch valve open or suction times rather than slowing down the pump cycle times as would have to be done with prior systems. Thus, a scalable pump is provided by which the flow rate of material from the pump can be, if desired, controlled without changing the pump cycle rate.

Figure 13:
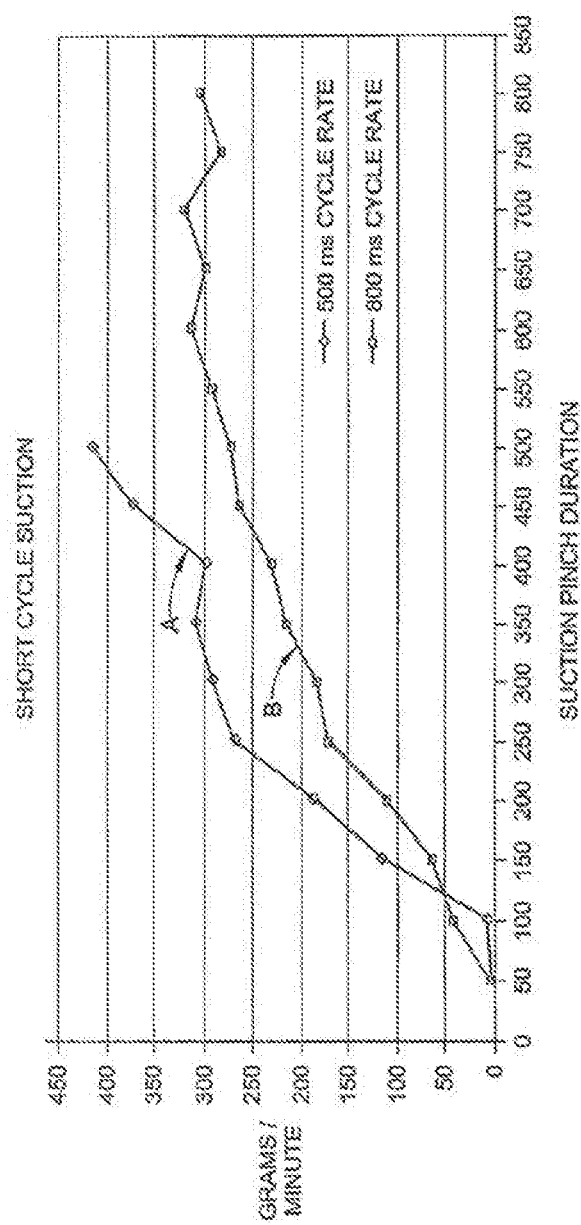
FIG. 13 is a graph depicting powder flow rates versus pinch valve open duration for two different pump cycle rates.

FIG. 13 further illustrates the pump control concept. Graph A shows flow rate versus pinch valve open duration at a pump cycle rate of 500 msec, and Graph B shows the data for a pump cycle rate of 800 msec. Both graphs are for dual chamber pumps as described herein. First it will be noted that for both graphs, flow rate increases with increasing pinch valve open times. Graph B shows however that the flow rate reaches a maximum above a determinable pinch valve open duration. This is because only so much powder can fill the pump chambers regardless of how long the pinch valves are open. Graph A would show a similar plateau if plotted out for the same pinch valve duration times. Both graphs also illustrate that there is a determinable minimum pinch valve open duration in order to get any powder flow from the pump. This is because the pinch valves must be open long enough for powder to actually be sucked into and pushed out of the pump chambers. Note that in general the faster pump rate of Graph A provides a higher flow rate for a given pinch valve duration.

The data and values and graphs provided herein are intended to be exemplary and non-limiting as they are highly dependent on the actual pump design. The control system 39 is easily programmed to provide variable flow rates by simply having the control system 39 adjust the valve open times for the pinch valves and the suction/pressure times for the pump chambers. These functions are handled by the material flow rate control 672 process.

In an alternative embodiment, the material flow rate from the pump can be controlled by adjusting the time duration that suction is applied to the pump pressure chamber to draw powder into the powder pump chamber. While the overall pump cycle may be kept constant, for example 800 msec, the amount of time that suction is actually applied during the 400 msec fill time can be adjusted so as to control the amount of powder that is drawn into the powder pump chamber. The longer the vacuum is applied, the more powder is pulled into the chamber. This allows control and adjustment of the material flow rate separate from using control of the suction and delivery pinch valves.

Use of the separate pinch valve controls however can augment the material flow rate control of this alternative embodiment. For example, as noted the suction time can be adjusted so as to control the amount of powder drawn into the pump chamber each cycle. By also controlling operation of the pinch valves, the timing of when this suction occurs can also be controlled. Suction will only occur while negative pressure is applied to the pressure chamber, but also only while the suction pinch valve is open. Therefore, at the time that the suction time is finished, the suction pinch valve can be closed and the negative pressure to the pressure chamber can be turned off. This has several benefits. One benefit is that by removing the suction force from the pressure chamber, less pressurized process air consumption is needed for the venturi pump that creates the negative pressure. Another benefit is that the suction period can be completely isolated from the delivery period (the delivery period being that time period during which positive pressure is applied to the pressure chamber) so that there is no overlap between suction and delivery. This prevents backflow from occurring between the transition time from suction to delivery of powder in the powder pump chamber. Thus, by using independent pinch valve control with the use of controlling the suction time, the timing of when suction occurs can be controlled to be, for example, in the middle of the suction portion of the pump cycle to prevent overlap into the delivery cycle when positive pressure is applied. As in the embodiment herein of using the pinch valves to control material flow rate, this alternative embodiment can utilize empirical data or other appropriate analysis to determine the appropriate suction duration times and optional pinch valve operation times to control for the desired flow rates. During the discharge or delivery portion of the pump cycle, the positive pressure can be maintained throughout the delivery time. This has several benefits. By maintaining positive pressure the flow of powder is smoothed out in the hose that connects the pump to a spray gun. Because the suction pinch valves can be kept closed during delivery time, there can be an overlap between the end of a delivery (i.e. positive pressure) period and the start of the subsequent suction period. With the use of two pump chambers, the overlap assures that there is always positive pressure in the delivery hose to the gun, thereby smoothing out flow and minimizing pulsing. This overlap further assures smooth flow of powder while the pinch valves can be timed so that positive pressure does not cause back flow when the suction pinch valves are opened. Again, all of the pinch valve and pressure chamber timing scenarios can be selected and easily programmed into the control system 39 to effect whatever flow characteristic and rates are desired from the pump. Empirical data can be analyzed to optimize the timing sequences for various recipes.

With reference next to FIGS. 14-16D, we have discovered diagnostic apparatus and methods that improve the ability to diagnose pump performance and anomalies when wear items begin to fail or exhibit faults or deteriorated operational performance. In pumps, for example a dense phase pump as set forth hereinabove, we have found that the pneumatic pinch valves 480, 481 and the hollow gas permeable filter members 438, 440 that function as the pump chambers account for the majority of downtime for service and repair. This is attributable to the fact that the pinch valves often are exercised at a high repetition rate which over time can result in fatigue to the point that a breach or leak occurs in the pinch valve body thereby preventing the pinch valve from fully closing. Also over time, the filter members 438, 440 tend to blind as very fine particles of powder coating material become embedded in the porous filter member material. This blinding reduces the suction force available to pull powder coating material into the pump chamber volume of the filter member.

Figure 14A:
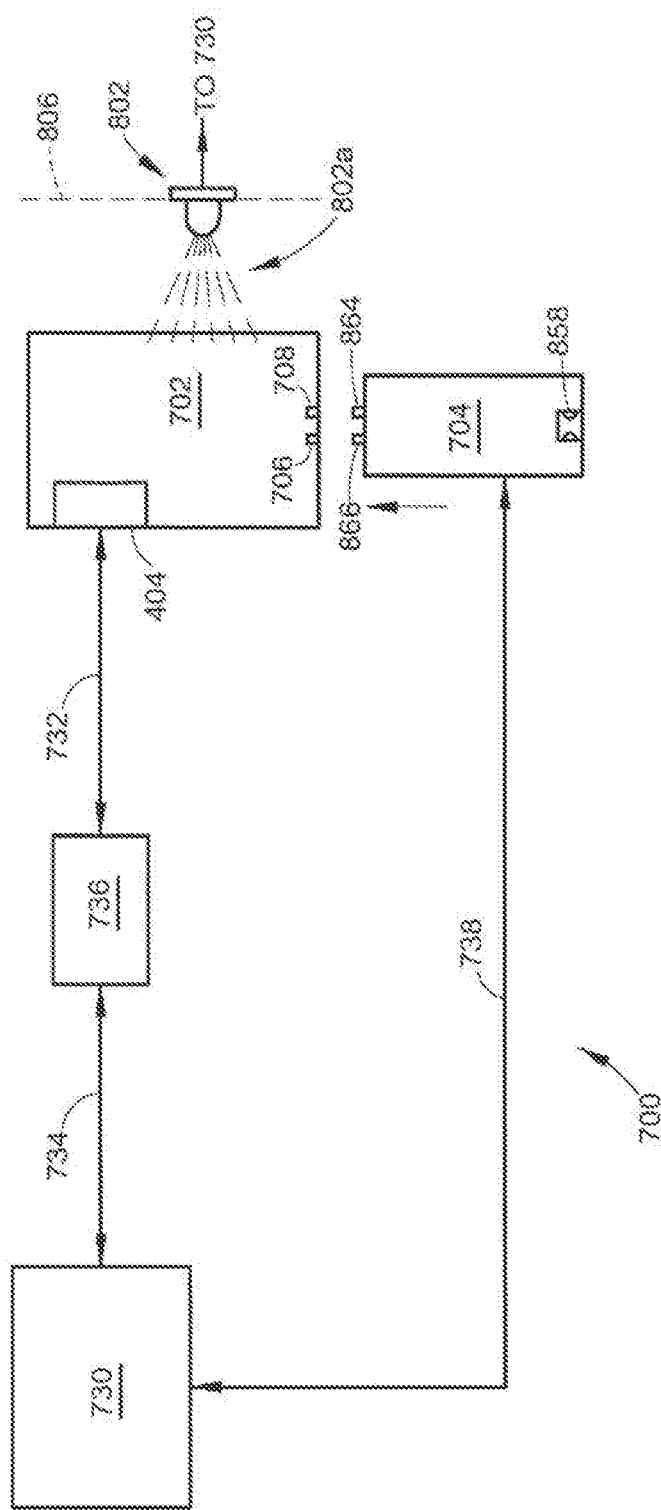
FIG. 14A is a functional block diagram of a diagnostic apparatus in accordance with the teachings herein.
Figure 14B:
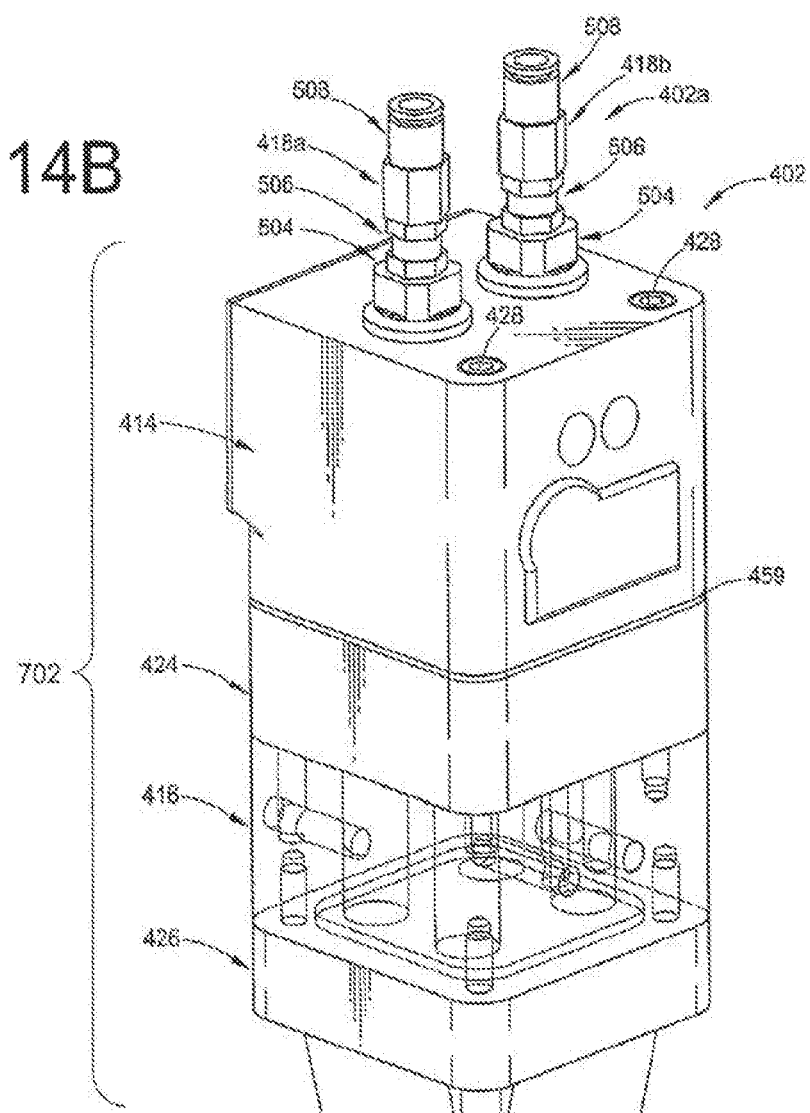
FIG. 14B is an embodiment of a diagnostic apparatus shown interfacing with a pump.
Figure 14C:
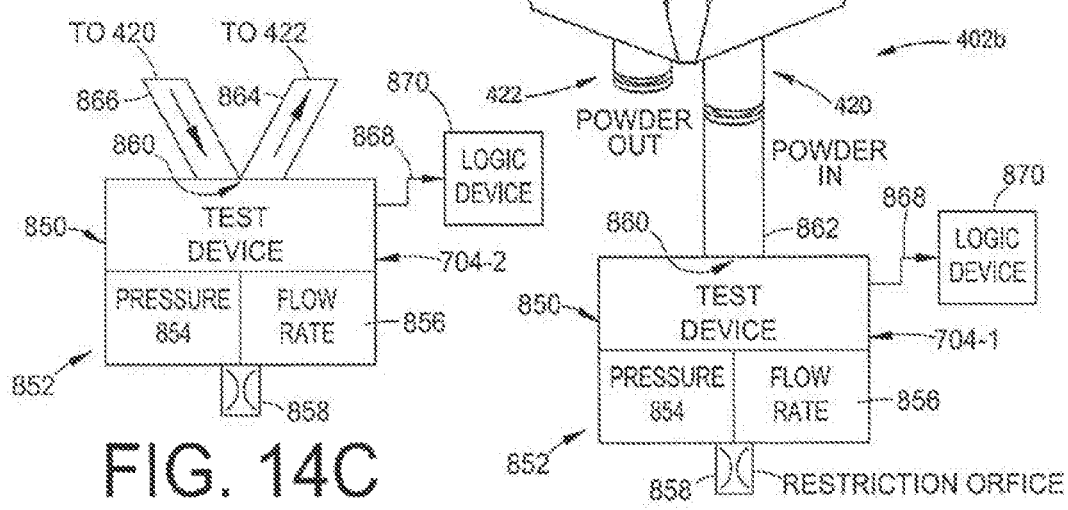
FIG. 14C is an alternative embodiment of a diagnostic apparatus for interfacing with a pump.
Figure 15:
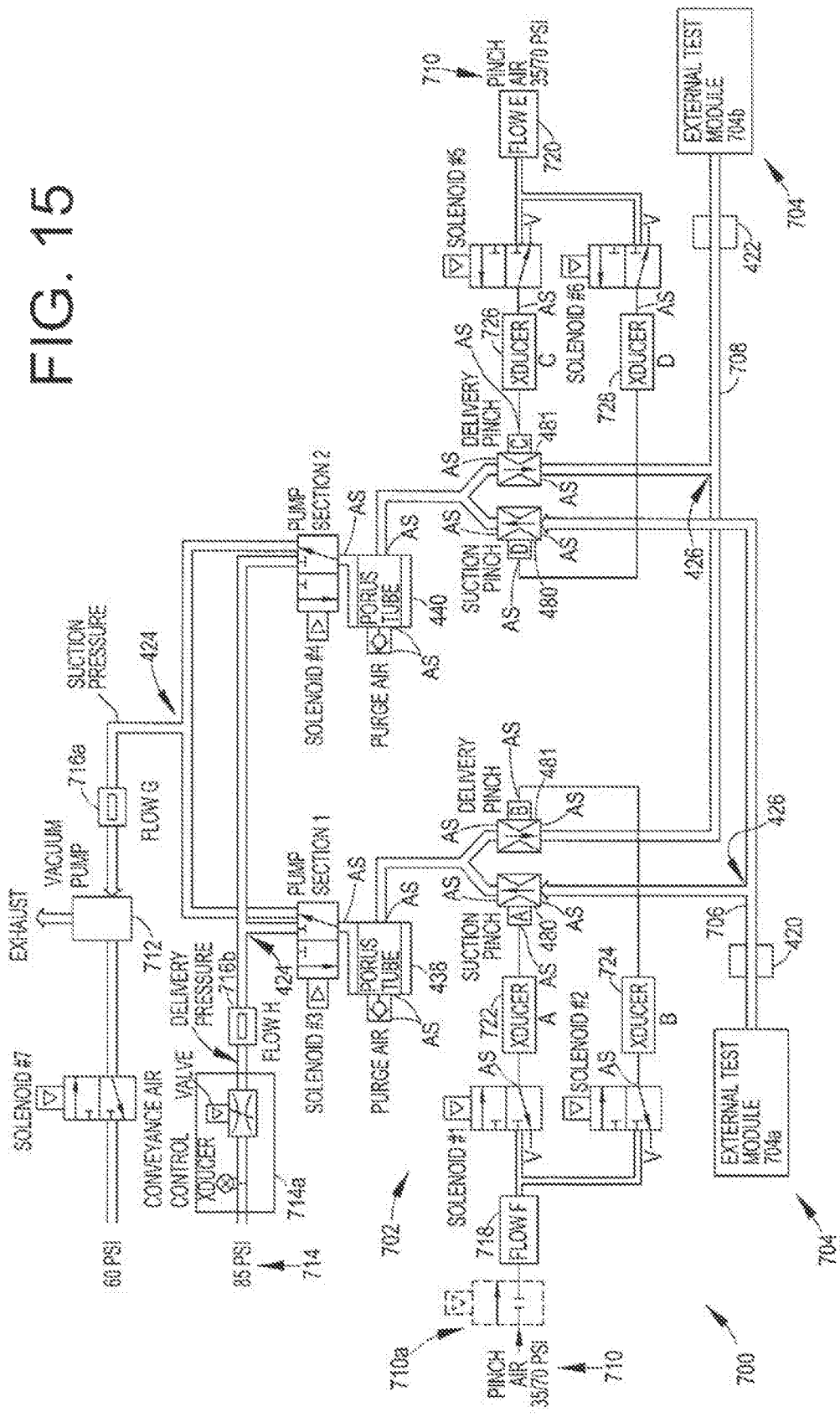
FIG. 15 is a functional schematic of the diagnostic apparatus of FIG. 14 interfacing with a powder coating material pump.

With reference to FIG. 15, an embodiment of a diagnostic apparatus 700 is shown in schematic form and interfaced with a powder coating material pump 702. FIG. 15 is comparable to FIG. 8 herein as an exemplary embodiment but somewhat simplified to highlight the delivery and suction flow paths for the powder coating material into and out of the pump 702 and related components. The pump 702 may be realized in any number of different ways and configurations and designs. An example of a pump 702 is the dense phase pump 400, 402 described hereinabove. Other dense phase pump designs may alternatively be used as needed, as well as pump designs that may or may not be strictly understood as operating with dense phase powder coating material conveyance. We will use like reference numerals where appropriate for elements in FIGS. 14-16D which may, although need be, comparable to the same elements in the embodiments of FIGS. 1-13 herein so that the description and operation of those components need not be repeated. Two basic features of dense phase style powder coating material pumps are the filter members 438, 440 and the pneumatic pinch valves 480, 481 (hereinafter "pinch valves"). These are the most common wear items in a powder coating material pump 702. The exemplary diagnostic apparatus and methods are directed to these components, and in particular detecting wear and/or failure of these parts as described below.

In an embodiment, the diagnostic apparatus 700 may be used to perform diagnostic tests on what we refer to as the suction side of the pump 702 or the delivery side of the pump 702, or both. By suction side of the pump 702, we mean that the tests may relate to powder uptake into the pump 702 from a supply of the powder, for example, via the pinch valves A and D (FIG. 15) and the first air permeable member 438 (labeled porous tube #1 in FIG. 15) as well as by operation of the control solenoid valves 1-4 and 7 (FIG. 15). By delivery side of the pump 702, we mean that the tests may relate to powder discharge from the pump 702, for example, via the pinch valves B and C (FIG. 15) and the second air permeable member 440 (labeled porous tube #2 in FIG. 15) as well as by operation of the control solenoid valves 3-6 and 7 (FIG. 15). Some diagnostic tests may overlap as to which components or functions of the pump 702 and controls are being diagnosed or tested.

In addition, a pump 702 typically includes one or more and often many air seals that prevent the loss of air from inside the pump to the ambient environment outside the pump. We provide a diagnostic apparatus and method that can also check the integrity of the air seals. The air seals may be present, for example, to provide air tight connections and interfaces between various parts internal to the pump 702 such as the filter members 438, 440, the pneumatic solenoid valves, air passages that are in fluid communication between the pump manifold 414 and the valve body 416 and so on. Of particular interest in the exemplary pump 702 are leak paths in the air passages that service the pinch valve pressure chambers and the filter member pressure chambers. Air seals include conventional seals such as o-rings, gaskets and other seals that may be used to provide air-tight interfaces. FIG. 15 includes various examples of air seal locations (labeled AS on FIG. 15), and corresponding air seals and gaskets are described hereinabove in the discussion relating to FIGS. 1-13. Such examples are not intended to be limiting either as to the number or location of various air seals in the pump 702 and the supply manifold 404.

We note at the outset that the diagnostic apparatus 700 may be interfaced with the pump 702 in a number of different ways. In an embodiment, the diagnostic apparatus 700 may be completely on-board, meaning that the components of the diagnostic apparatus 700 may be incorporated into the pump 702 and/or with the supply manifold 404. This will tend to be but need not be necessarily a more expensive embodiment due to the need for on-board diagnostic components such as air flow detectors and pressure detectors, but may have the advantage that the diagnostic methods can be carried out fully automatic as programmed into the control system 39. The control system 39 can execute a diagnostics program or logic sequence to run the various diagnostic tests described hereinbelow using the same valve controls and air supplies that are used for regular pump operation.

In an alternative embodiment, the diagnostic system 700 may be an external diagnostic apparatus that interfaces pneumatically with the pump 702 and also may interface electronically with the control system 39, or have its own diagnostic control system that interfaces with the control system 39. A completely external diagnostic apparatus may be interfaced pneumatically with the pump inlet 420, the pump outlet 422, or both, with the electronic control and logic being executed by the control system 39.

In another alternative embodiment, the diagnostic apparatus 700 may be thought of as a hybrid version in which the both on-board diagnostic components and external diagnostic components may be used. Other embodiments of a diagnostic apparatus 700 may alternatively be used in many different configurations and interfaces with the pump 702.

Which embodiment of a diagnostic apparatus 700 is used for a particular pump 702 will depend in part on cost due to the added expense if the diagnostic components are provided on-board the pump 702 and/or the supply manifold 404, however, the use of on-board diagnostic components can increase the flexibility and availability to perform additional diagnostic tests.

FIG. 15 illustrates various examples of both on-board and external diagnostic components, with the intent of showing the various options in a single view. However, as will be further explained, which on-board components, if any, are used for a particular pump design and application may be chosen by the designer based on cost, level of diagnostic testing desired, and availability of space within the pump 702 or with the supply manifold 404, in order to accommodate the diagnostic components, and so on.

It should be noted that the pump 702 schematic illustrated in FIG. 15 includes two pump chambers (porous filter #1 and porous filter #2) provided by the two filter members 438, 440 and four pinch valves including two inlet or suction pinch valves 480 (pinch valves A and D), and two outlet or delivery pinch valves 481 (pinch valves B and C). However, alternative pump designs may only use a single pump chamber with two pinch valves, or may use more than two pump chambers and more than four pinch valves. In terms of explaining the diagnostic concepts herein, a single pinch valve and a single pump chamber may be considered. Therefore, in a simplified form, the diagnostics can be thought of in terms of testing one filter member and one pinch valve at a time, or some diagnostic tests may test more than one pinch valve or filter member at a time. The general idea then is to diagnose and identify to the extent needed the source of a fault, for example, a leak in a pinch valve or blinding in a filter member, or a leak in an air seal. Also, although the pump 702 may be the type as described herein in which the powder coating material flows into and out of a pump chamber from a single end of the pump chamber, such is not required, and the diagnostic apparatus and methods may be used with pump designs in which the powder coating material enters a pump chamber from one end and exits through a different or opposite end.

In a basic form, an embodiment of a diagnostic apparatus 700 may be used to test a pinch valve and a filter member. But this can then be easily scaled to accommodate a particular pump design, for example, to test two or more filter members 438, 440 and two or more pinch valves 480, 481. The logic table of FIG. 16A-16D is for a pump 702 such as described herein that includes two filter members and four pinch valves but such is not to be construed as a limitation on the application of the teachings herein. The logic table of FIG. 16A-16D indicates the type of test (flow or pressure) and the detector that may be used (see columns labeled Suction Port and Delivery Port). The Results column give examples of the type of results that may be obtained and example conclusions that may be made based on the tests, but such results are not an exhaustive list because by running various diagnostic tests as well as others, the diagnostic apparatus may be used to determine other faults or further isolate a cause. The columns labeled Solenoid and Pinch Valve provide the status or test condition of each device during each of the tests, and the column labeled Conveyance Air provides the status or test condition for the conveyance air input 714 for each of the tests. It should be noted, however, that the tests and information and results that are provided in FIG. 16A-16D are not intended to be an exhaustive, exclusive or required list of parameters, tests and conditions; but rather are exemplary of the types of on-board or external diagnostic tests that can be performed as taught herein, including but not limited to pressure and flow tests for the air permeable filters 438, 440, leak tests (by pressure or air flow) for the pinch valves 480, 481, and leak tests (by pressure or air flow) for the air seals AS.

With reference to two embodiments illustrated in FIGS. 14B and 14C, the diagnostic apparatus 700 may be realized in the form, for example, of an external diagnostic apparatus 704-1 (FIG. 14B) or external diagnostic apparatus 704-2 (FIG. 14C) that interfaces as at 704a and 704b with the pump inlet 420 and the pump outlet 422 respectively. The pump 702 is exemplified by the powder coating material pump 404 of FIG. 2B. The schematic separation of 704a and 704b in FIG. 15 is simply for explanation and understanding and does not represent a necessary physical embodiment of the interface. We use the terms diagnostic apparatus and test device interchangeably herein.

In an embodiment of FIG. 14B, an external diagnostic apparatus 704-1 may include a housing 850 that encloses one or more diagnostic devices 852. As explained below, the types of diagnostic devices 852 may be selected based on the diagnostic tests that will be run. For example, the diagnostic devices 852 may include a pressure detector 854 and a flow rate detector 856. Flow rate may be determined in many ways, including using a differential pressure sensor across an optional restriction orifice 858. An advantage in some cases of using a restriction orifice 858 for flow rate tests is that on the suction side (powder coating material inlet 420), fresh ambient air is drawn into the pump 702.

The difference between the embodiments of FIG. 14B and FIG. 14C is the pneumatic interface with the pump 702. In the FIG. 14B embodiment, the housing 850 may include a single diagnostic port 860. The diagnostic port 860 may interface selectively with the pump inlet port 420 or the pump outlet port 422 using a connector 862 or alternative interface means to establish fluid communication with the selected pump port 420, 422. The connector 862 may be as simple as a push fit or threaded connection with the pump inlet port 420 or the pump outlet port 422. For diagnostic tests on the suction side (negative pressure), the diagnostic port 860 is connected to the pump inlet port 420 and for diagnostic tests on the delivery side (positive pressure), the diagnostic port 860 is connected to the pump outlet port 422. The diagnostic port 860 admits suction or delivery air flow based on whether the diagnostic port 860 is connected in fluid communication with the pump inlet port 420 or with the pump outlet port 422. In the FIG. 14C embodiment, the external diagnostic apparatus 704-2 includes the housing 850 with a diagnostic port 860. But, the housing 850 may be adapted so that the diagnostic port 860 may open to a first connector 864 and a second connector 866. These connectors 864, 866 may together be connected respectively to one of the pump inlet port 420 and the pump outlet port 422 so that there is no need to switch over the external diagnostic apparatus 704-2 between ports 420, 422 in order to run suction side tests and delivery side tests.

In either of the pneumatic interface embodiment, a communication link 868 may be provided so that data and information collected by the external diagnostic apparatus 704 may be received by a logic device 870. The logic device 870 may be any apparatus that receives the information and/or signals from the external diagnostic apparatus 704 and processes that information to determine fault conditions, for example leaks, or other anomalies with the pump operation, for example, blinding of the filter members. The logic device 870, therefore, may be incorporated as part of the control system 39 but such is not required. The logic device 870 executes the logic table of FIG. 16A-16D and may perform additional or fewer tests as the case may be for a particular diagnostic sequence.

The external diagnostic apparatus or test module 704 interfaces with the pump inlet port 420 and the pump outlet port 422 in order to perform tests on the pinch valves 480, 481 (in an embodiment, there are four pinch valves A, B, C and D in FIG. 15) and the two filter members 438, 440 (porous tubes #1 and #2). In an embodiment, the external test module 704 may be used to perform a leak test on the pinch valves 480, 481 and a flow test on the filter members 438, 440. In order to do so, the external test module 704 interfaces with the powder coating material inlet flow path 706 of the pump 702 (also referred to herein as the suction flow path) via the suction port 420, and the powder coating material outlet flow path 708 out of the pump 702 (also referred to herein as the delivery flow path) via the delivery port 422. Because there are two pump chambers, each of the powder coating material flow paths, namely the suction flow path 706 and the delivery flow path 708, are split in two by the second Y-block 426 (FIG. 2A). The pinch valves 480, 481 form part of the suction and delivery flow paths and are used to control powder flow through the pump 702. For example, when a suction pinch valve 480 is closed, the flow path therethrough should be completely blocked so that powder cannot be drawn into the associated filter members 438, 440 from the pump inlet port 420. When the suction pinch valve 480 is open, powder coating material is able to flow into the associated in-line filter member 438, 440 when suction is applied to the associated pressure chamber 434, 436 (FIG. 2C). The other pinch valves operate in a similar manner, although the delivery pinch valves 481 when open allow powder coating material to flow out of the associated in-line porous filter 438, 440 to the pump outlet port 422 when positive pressure is applied to the associated pressure chamber 434, 436).

For most diagnostics tests, the solenoid control valves, the pinch valves and the filter members do not convey powder coating material. The powder coating material flow paths 706, 708 therefore only have air passing through for the diagnostic tests. Powder coating material is not suctioned up into the pump 702 because the pump inlet 420 is not connected to the powder coating material supply via the feed center 22 (FIG. 1).

The pinch valves 480, 481 are closed when positive air pressure from a pinch air pressure source 710 is applied to the respective pinch valve pressure chamber 446 (FIGS. 5A and 5B). A solenoid valve 1 controls when the pinch air is applied to suction pinch valve A; solenoid valve 2 controls when the pinch air is applied to delivery pinch valve B; solenoid valve 5 controls when the pinch air is applied to delivery pinch valve C; and solenoid valve 6 controls when the pinch air is applied to suction pinch valve D (note that the pinch valve lettering and the solenoid valve numbering in FIG. 15 corresponds to the designations used in the logic table of FIG. 16A-16D herein.) A vacuum generator 712 is used to supply suction pressure to the filter members 438, 440 with the timing controlled by a solenoid valve 7, and positive pressure delivery or conveyance air is supplied from a pressure source 714. Suction timing is controlled by operation of solenoid valve 3 for the first filter member 438 and by operation of solenoid valve 4 for the second filter member 440. Delivery timing is controlled by operation of solenoid 3 for the first filter member 438 and by operation of solenoid valve 4 for the second filter member 440. Also, because the illustrated embodiment has two pump chambers, the delivery pressure 714 and the suction pressure 712 are split in two by the first Y-block 424 (FIG. 2A.) Solenoid valve 3 controls when suction pressure or delivery pressure are applied to the first porous filter 438 and solenoid valve 4 controls when suction pressure or delivery pressure are applied to the second porous filter 440 (note that solenoid valves 3 and 4 are normally off meaning that they are in suction pressure mode when off and delivery pressure mode when energized.) Solenoid valve 7 is optional and may be used to control when suction pressure is supplied to solenoids 3 and 4, and allows independent control of the vacuum generator 712. The control system 39 controls through software programs the timing and control of the solenoids valves.

The solenoid valves 1-7 may be realized as slide or spool valves, and each solenoid valve preferably includes a vent V which vents pressurized air to ambient when the solenoid valve is in the closed position (suction mode). The vents V are normally open and are blocked when the solenoid valve is open so as to provide pinch air pressure to pinch the associated pinch valve closed. All the solenoid valve vents V may be connected together via air passages that are preferably inside the supply manifold 404 to a single vent port 880 (FIG. 7) that is open to the ambient environment. For example, as illustrated in FIG. 7, the vent port 880 may be formed through an outside surface of the supply manifold 404.

Note that the diagnostic tests may be performed while operating the pump (either through normal pump operating cycles or programmed diagnostic cycles) but that powder coating material is not supplied to the pump inlet, so that pressure and flow tests refer to air, not powder coating material.

A leak test on a pinch valve 480, 481 can be performed by providing the external test module 704 to test pressure, flow rate or both. A pressure test may be a static test that looks to see that a pressure is maintained. A pressure test may alternatively be a pressure test that checks pressure decay or pressure build-up over time. Flow rate may be checked rather than pressure by looking for flow of air that would be due to a leak.

If a leak fault is detected it may indicate a problem with the pinch valve being ruptured or a problem with the pinch air pressure being delivered to the pinch valve pressure chamber. In an embodiment, the external test module 704 may be realized in the form of a visual or electronic pressure transducer to detect pressure, a differential pressure transducer with a restriction orifice to detect flow, or alternatively other techniques to detect flow including visual devices such as a floating ball meter or a mass flow meter to name a few. For example, to test for a leak in the suction pinch valve A, the solenoid 1 is energized or turned on so that positive pinch pressure from pinch air pressure source 710 is applied to the pinch valve pressure chamber 446a of the pinch valve A to try to close the suction pinch valve A. Delivery pressure (denoted conveyance air in FIG. 16A-16D) is applied to the first porous filter 438 by turning on solenoids 3 and 4. For example, conveyance air may be set at 1 cfm. If the pinch valve A is operating properly, then positive pressure will not be detected at the pump inlet or suction port 706. Alternatively, no air flow should be detected. This test of pinch valve A is found in the logic table of FIG. 16A-16D as test number 17. Tests 18-20 provide the logic for the individual tests of pinch valves B, C and D using the external diagnostic apparatus 704 connected to the suction flow path 706 for pinch valve D and to the delivery flow path 708 for pinch valves B and C. For tests 17-20, the solenoid valve 7 is off so that there is no vacuum generated, and conveyance air or positive pressure is applied from source 714 because solenoid valves 3 and 4 are on.

As shown with tests 2B and 3B of the logic table, all four pinch valves 480, 481 can be tested at the same time. All four pinch valves are A, B, C and D are closed by turning on their associated solenoid valves 1, 2, 5 and 6. The vacuum solenoid valve 7 is initially on so that a vacuum or suction is pulled, but then the valve 7 is turned off which should trap the suction pressure. Vacuum or suction pressure should not be detected at the suction port 706 or at the delivery port 708, for example, after waiting about thirty seconds or so. But this test checks all four pinch valves at the same time, so a leak is not be further isolated to a specific leaky pinch valve with this test alone.

Tests 0 and 1 may be used to check the vacuum generator 712 and any associated vacuum regulator (not shown in FIG. 15, but see FIG. 8). The difference between test 0 and test 1 is that in test 0 the suction side pinch valves A and D are open with the delivery pinch valves B and C closed, with the opposite being the case in test 1. Therefore, in test 0 the delivery port 422 should show no vacuum or air flow, and the full vacuum or air flow should be detected at the suction port 420. If no vacuum is detected at the suction port 420, then the vacuum generator or related components may be bad. For test 1 then, the suction port 420 should show no vacuum or air flow, and the full vacuum or air flow should be detected at the delivery port 422. If no vacuum is detected at the delivery port 422, then the vacuum generator or related components may be bad. However, because each pair of suction pinch valves 480 and delivery pinch valves 481 share a single pneumatic connection via the suction flow path 706 and the delivery flow path 708 respectively, if a leak is detected by the external test module 704 it can only be determined that one or both of each pair of pinch valves tested may have an associated fault. Again, in the simplified case of a single pump chamber, a single delivery pinch valve and a single suction pinch valve can be tested for leaks or other associated faults.

Test 2A may be used to check for leaks in pinch valves B and C (there should be no suction at the suction port 420 and there should be suction at the delivery port 422), and test 3A may be used to check for leaks in pinch valves A and D (there should be no suction at the delivery port 422 and there should be suction at the suction port 420). With these tests being done with the external diagnostic apparatus 704 looking for vacuum pressure at the suction and delivery ports, a leak is not further identified as to which pinch valve specifically is leaking using this test alone.

It will be noted that the tests 0, 1, 2A, 2B, 3A and 3B are done with suction pressure and not delivery pressure (conveyance air being 0). But alternatively or in addition to, the tests may be run using conveyance air (by testing for the presence or absence of air flow or pressure in the associated suction or delivery port).

Another diagnostic test that may be performed with the external test module 704 is to test the performance of the filter members 438, 440. If one or both of the filter members 438, 440 is partially or completely obstructed, or exhibiting blinding, then the pressure or air flow or both may be used to detect such types of anomalies or faults. These tests are identified as tests 4-7 in the logic table of FIG. 16. Tests 4 and 5 are tests based on delivery pressure (but also may be a pressure based test with a restriction orifice), and tests 6 and 7 are tests based on suction air flow (but also may be a pressure based test with a restriction orifice), with tests 4-7 being run with the external diagnostic apparatus 704. The filter member tests 4 and 5 using delivery pressure are run with solenoid 7 off, meaning that no suction is being generated, and also the tests 4 and 5 are run via the delivery pinch valves B and C being open (conveyance air being set at a suitable test value, for example, 1 cfm).

As an example, test 4 may be performed with delivery pressure to the first filter member 438 (which in the logic table and FIG. 15 is identified as porous tube #1), wherein solenoid valves 2, 4 and 7 are off and solenoid valves 1, 3, 5 and 6 are on. This causes delivery pinch valve B to be open and the delivery air 714 is introduced to the pressure chamber for the first filter member 438 through the solenoid valve 3. Under these test conditions, air flow may be checked in the delivery flow path 708, for example using the external diagnostic apparatus 704 being connected with the delivery port 422. To perform test 5 for the second filter member 440 (which in the logic table and FIG. 15 is identified as porous tube #2), solenoid valves 3, 5 and 7 are off and solenoid valves 1, 2, 4 and 6 are on. This causes delivery pinch valve C to be open and the delivery air 714 is introduced to the pressure chamber for the second filter member 440. Under these test conditions, air flow may be checked in the delivery flow path 708, for example using the external diagnostic apparatus 704 being connected with the delivery port 422. For both tests 4 and 5, if the air flow measurement is low at the delivery port 422, it could indicate that the filter member under test is either plugged, or becoming blinded or possibly that the associated solenoid valve 3 or 4 is not working properly. Note that the test may be an air flow test, or analogously may be done using a restriction orifice to generate a differential pressure measurement. For example, with conveyance air set at 1 cfm, for the exemplary pump the differential pressure (relative to ambient atmosphere) should be greater than 5 psi (keeping in mind that for the exemplary embodiment as noted above, the restriction orifice 858 (FIGS. 14B and 14C) is open to ambient atmosphere. In this way, a pump operational problem can be diagnosed to a few possible causes rather than having to analyze the entire pump for maintenance.

It should be noted that air flow and pressure values herein are exemplary in nature and not intended to be limiting. Actual values for other embodiments will depend on the pump design and many other factors of the material application system.

In an alternative embodiment for the delivery pressure tests 4 and 5, rather than using the external diagnostic apparatus 704, an on-board air flow detector 716b (also referred to on FIG. 15 as Flow H), for example an air flow detector 716b, may be positioned in-line between the positive pressure or conveyance air source 714 and the delivery port 422. For example, as shown in FIG. 15, the air flow detector 716b may be connected to the delivery flow path between the conveyance air source 714 and the solenoid valves 3 and 4. The air flow detector 716b could alternatively be installed, for example, on the supply manifold 404 with appropriate air passages provided to connect the air flow detector 716b at any convenient position that is in-line with the delivery flow path that extends from the conveyance air source 714 to the pump outlet port 422.

Tests 6 and 7 are tests based on suction air flow with the external diagnostic apparatus 704 being connected to the suction flow path 706. Also, the filter member tests 6 and 7 using suction pressure are run with solenoid 7 on, meaning that suction is being generated, and with solenoid valves 3 and 4 off meaning that suction is applied through the filter members #1 and #2 respectively, and further that the tests 6 and 7 are being run via the suction pinch valves A and D respectively. Also, for these tests note that the conveyance or positive pressure air may be set at 0 cfm. As an example, to test the first filter member 438 with suction, solenoid valves 1, 3 and 4 are off and solenoid valves 2, 5, 6 and 7 are on. This causes suction pinch valve A to be open and the suction 712 is introduced to the pressure chamber for the first filter member 438. Under these test conditions, air flow may be checked in the suction flow path 706, for example using the external diagnostic apparatus 704 being connected with the pump inlet port 420. To test the second filter member 440, solenoid valves 3, 4 and 6 are off and solenoid valves 1, 2, 5 and 7 are on. This causes suction pinch valve D to be open and the suction pressure 714 is introduced to the pressure chamber for the second filter member 440. Under these test conditions, air flow may be checked in the suction flow path 706, for example using the external diagnostic apparatus 704 being connected with the pump inlet port 420. For both tests 6 and 7, if the air flow measurement is low at the inlet port 420, it could indicate that the filter member is either plugged, or becoming blinded, or that possibly the vacuum generator 712 is not operating properly. For example, a new filter member may exhibit an induced flow of approximately 1.4 cfm at a suction pressure of approximately 10 inches Hg. If the induced flow drops to approximately 0.25-0.3 cfm then the filter may have a fault such as blinding or may be blocked or partially blocked, or there may be a problem with the vacuum source 712. As with the delivery pressure tests version, alternatively the air flow can be converted to a differential pressure measurement using the restriction orifice 858. In this way, a pump operational problem can be diagnosed to a few possible causes rather than having to analyze the entire pump for maintenance.

In an alternative embodiment for the suction tests 6 and 7, rather than using the external diagnostic apparatus 704, an on-board air flow detector 716a (also referred to as Flow G FIG. 15), for example an air flow detector, may be positioned in-line between the vacuum generator 712 and the suction port 420. For example, as shown in FIG. 15, the air flow detector 716a may be inserted in the suction flow path between the vacuum generator 712 and the solenoid valves 3 and 4. The air flow detector 716a could be installed, for example, on the supply manifold 404 with appropriate air passages provided to connect the air flow detector 716a in-line with the suction pressure flow path that extends from the vacuum generator 712 to the inlet port 420.

Other examples of on-board tests are provided at tests 8-12 in the logic table of FIGS. 16A-16D. These various diagnostics tests can be run using on-board diagnostic pressure and air flow detectors for example. The various on-board detectors are optional and each may be used or omitted or others used depending on the diagnostics to be performed. Still further, on-board diagnostics may be used in combination with the external diagnostic apparatus 704 as needed. To this end, in an embodiment, the on-board first air flow detector 716*a* (also referred to in the drawings as Flow G) may be included in the suction pressure line from the vacuum pump 712; an on-board second flow detector 718 (also referred to in the drawings and the logic table as Flow F) may be included in the pinch air line from the pinch air pressure source 710 to the solenoid 1 and the solenoid 2 for the pinch valve A and pinch valve B; an on-board third flow detector 720 (also referred to in the drawings and the logic table as Flow E) may be included in the pinch air line from the pinch air pressure source 710 to the solenoid 5 and solenoid 6 for the pinch valve C and the pinch valve D; and an on-board fourth air flow detector 716*b* (also referred to in the logic table and in FIG. 15 as Flow H). An on-board first pressure transducer 722 (transducer A) may be included between the solenoid 1 and the pinch valve A; an on-board second pressure transducer 724 (transducer B) may be included between the solenoid 2 and the pinch valve B; an on-board third pressure transducer 726 (transducer C) may be included between the solenoid 5 and the pinch valve C; and an on-board fourth pressure transducer 728 (transducer D) may be included between the solenoid 6 and the pinch valve D.

The logic table of FIGS. 16A-16D provides the various control states of the solenoids and pinch valves to execute these tests 8-12. For example, all four pinch valves may be tested at test 8. All the pinch valves A-D are closed, with the delivery port 422 closed or plugged and with solenoid 7 off and conveyance air off but pinch air pressure source 710 remains on. The pinch valves may then be checked for leaking by using both the Flow E and Flow F detectors 720 and 718 respectively, to detect air flow which would indicate a leak in one or more of the valves, because with all the pinch valves commanded to be closed, the positive pinch valve pressure should hold with no flow (the pinch valve pressure chambers will build up pressure to the pinch valve pressure at which point air flow should stop if no leaks). Alternatively, rather than checking air flow, a pressure detector could be used to determine a time based pressure decay rate to indicate whether there is a leak. For example, the transducers A-D respectively may be used to check for pressure decay in the associated pressure chambers for the pinch valves under test, but an additional pinch air pressure source control valve 710*a* (shown in phantom in FIG. 15 as it is optional if pressure decay tests are desired on the pinch valves A-D) would have to be included to isolate the pinch air pressure source 710 from the pinch valve pressure chambers. Since all the pinch valves A-D operate from a common pinch air pressure source 710, only one pinch air pressure source control valve 710*a* is needed. With all four valves closed at the same time, the test would indicate one or more valves is at fault but not which one.

Tests 9-12 may be used to test the pinch valves individually with the pressure transducers A-D. As an example, for test 10, pinch valve B can be checked for leakage. In this test, only pinch valve B is closed, the delivery port 422 is plugged or closed (may also be unplugged or open) and the solenoid 7 is off, with the pinch air pressure source 710 on. The flow detector F may be used to detect leakage in the pinch valve B. For a pressure decay test, pressure transducer B may then be used to check for pressure decay over time to determine whether the pinch valve B is exhibiting a leak but the additional pinch air pressure source control valve 710*a* would have to be included to isolate the pinch air pressure source 710 from the pinch valve pressure chambers.

It will be recalled that when the pinch valves are closed, the solenoid valve vents V are blocked.

Test 13-16 provide an example of diagnostic tests that may be performed without needing to add any additional diagnostic detectors to the pneumatic pump controls. For these tests, individually each pinch valve A-D is closed, conveyance air is on (for example at about 1 cfm), the vacuum generator 712 is off, and the delivery port 422 and the inlet port 420 are plugged closed. Under these conditions, if a pinch valve under test is leaking, air flow will be detected at the vent port 880. This may be an audible air flow or a flow device may be used at the vent port 880.

Test 21 is an example of a diagnostic test that can be performed on the overall pump 702 to check for the presence of a leak. In this test, all the pinch valves are open and conveyance air 714 is on (at about 1 cfm for example) and the vacuum generator 712 is off. The delivery port 422 and the inlet port 420 are plugged or alternatively may include a pressure transducer or air flow detector using the external diagnostic detector 704. After the pump 702 is pressurized, the Flow H detector 716*b* may be used to check for any air flow that would indicate that there is a leak somewhere in the pump 702. Alternatively, rather than using the flow H detector 716*b*, a pressure detector may be used to test for pressure decay over time. For such an alternative test, the conveyance air 714 would be interrupted to the solenoid valves 3 and 4 (for example, the conveyance air control 714*a* includes a control valve). Under such conditions, the pressure should hold if there are no leaks, but will decay over time if there is a leak somewhere in the pump. By also checking for air at the vent port 880, if no air flow is present at the vent port 880, then the leak cannot be due to a leak in the pinch valve. Test 22 is similar to test 21 except that in addition, the vent port 880 is also plugged. In this case, air flow at the detector 716*b* (Flow H) would indicate that the pump leak is a result of a leaking air seal in the pump or a leaking valve. By running tests 21 and 22, if test 21 indicates that there is no leak into the vent port 880, then any leak detected during test 22 would be due to an air seal leak or other leak other than a leaking pinch valve. In other words, for a static pressure test as in test 21, if there is air being vented to the vent port 880, then at least one of the pinch valves is leaking.

The control system 39 may be programmed to run the diagnostic tests during time periods when the pump 702 is not being used to supply powder coating material to a spray gun to coat parts. Also, the control system 39 may interface with the on-board diagnostic components so as to provide automatic, i.e. programmed diagnostic testing. For example, the diagnostic tests may be performed as part of a start-up routine or calibration routine; or may be run during down time such as color change operations; or even may be performed in conjunction with the timing used for recipes for specific work pieces being processed (for example if there will be lags in operation during part changeover or between parts.) The diagnostic tests may be rather quick so as to cause minimal if any interruption in the normal operation of the pump 702. The order of the tests listed in the logic table is arbitrary and may be done in any order or one or more omitted.

All of the on-board diagnostic detectors are optional so that one or more may be used as needed. Also, the air flow detectors may be redundant with the pressure transducers so that only one form might be used or both may be used as needed, keeping in mind that differential pressure transducers may be used for flow detection. Each transducer A, B, C and D may be used to confirm that its associated pinch valve A, B, C and D is operating properly based on a build-up of pressure in the associate pinch valve pressure chamber. Flow E and Flow F may alternatively be tested with the pressure tests or both test methods may be used. If a pinch valve has a break or leak, then the pressure profile for pressure applied to the pinch valve pressure chamber to close the pinch valve will indicate a fault (for example, too slow to build pressure or not reaching an expected pressure.) Alternatively or in addition to pressure, flow can be tested because there should be no flow of air into the pinch valve pressure chambers when the valves are being closed after a period of time sufficient for pressure to build.

Thus, the on-board diagnostics may provide greater flexibility and options for testing for faults in the pinch valves and the porous filters, but at a price of added test components on-board the supply manifold or with the pump. Alternatively, sensing lines or passages for pressure and flow may extend from the desired test points to external ports on the pump 702 (not shown) similar to the already present suction port 706 and the delivery port 708, however, such added passages may be a challenge for small footprint pumps and also may increase the number of air sealed passages needed within the pump 702.

FIG. 14A illustrates an embodiment of a diagnostic apparatus 700 that may be externally interfaced with the pump 702. A processing system 730, for example a computer or other logic processor or any smart device, may be used for the control system 39 to control operation of the pump 702 and/or to execute the diagnostic tests. The processing system 730 is an example of a logic device 870 discussed hereinabove for the diagnostic apparatus 700. The processing system 730 may interface with the pump supply manifold 404 (FIG. 7) over a network, for example, a CAN network 732. The interface, for example, may be from a USB connection 734 to a USB to CAN converter 736 as is known or other available interface between the processing system 730 and the pump 702 controls to control the various solenoids and pressure supplies (vacuum and conveyance air) for operating the pump 702. The processing system 730 may also include the programming for various recipes to operate the pump 702 based on the nature and type of parts being processed and the nature and types of powder coating materials being used, among other control functions. Accordingly, the processing system 730 may also include the programming and routines for performing the diagnostic tests during down times or non-powder times that the pump 702 is not being used for normal operations. This may be used, for example, to run the diagnostic tests using the on-board diagnostic components as described above. Although typically the control system 39 is not built into the pump 702, such is another available option which would provide a completely on-board self-diagnostic function in the pump 702.

The processing system 730 in another embodiment may interface with the external diagnostic test device 704 through a suitable interface, for example, a USB connection 738. In such cases, the diagnostic apparatus 700 is completely external the pump 702 and interfaces through the pump suction port 706 and delivery port 708 (see for example FIG. 14C and FIG. 14B) thereby not requiring any on-board additions or changes to the pump 702 or the supply manifold 704 if so desired. Thus, we provide a diagnostic apparatus 700 that may be used with field based pumps already in service and without need to physically take the pump 702 off-line or remove it from the overall powder coating system. The logic table of FIGS. 16A-16D sets forth the steps for diagnostic methods as described herein as well as the logic for programming the processing system 730 to execute the desired diagnostic tests.

Figure 17:
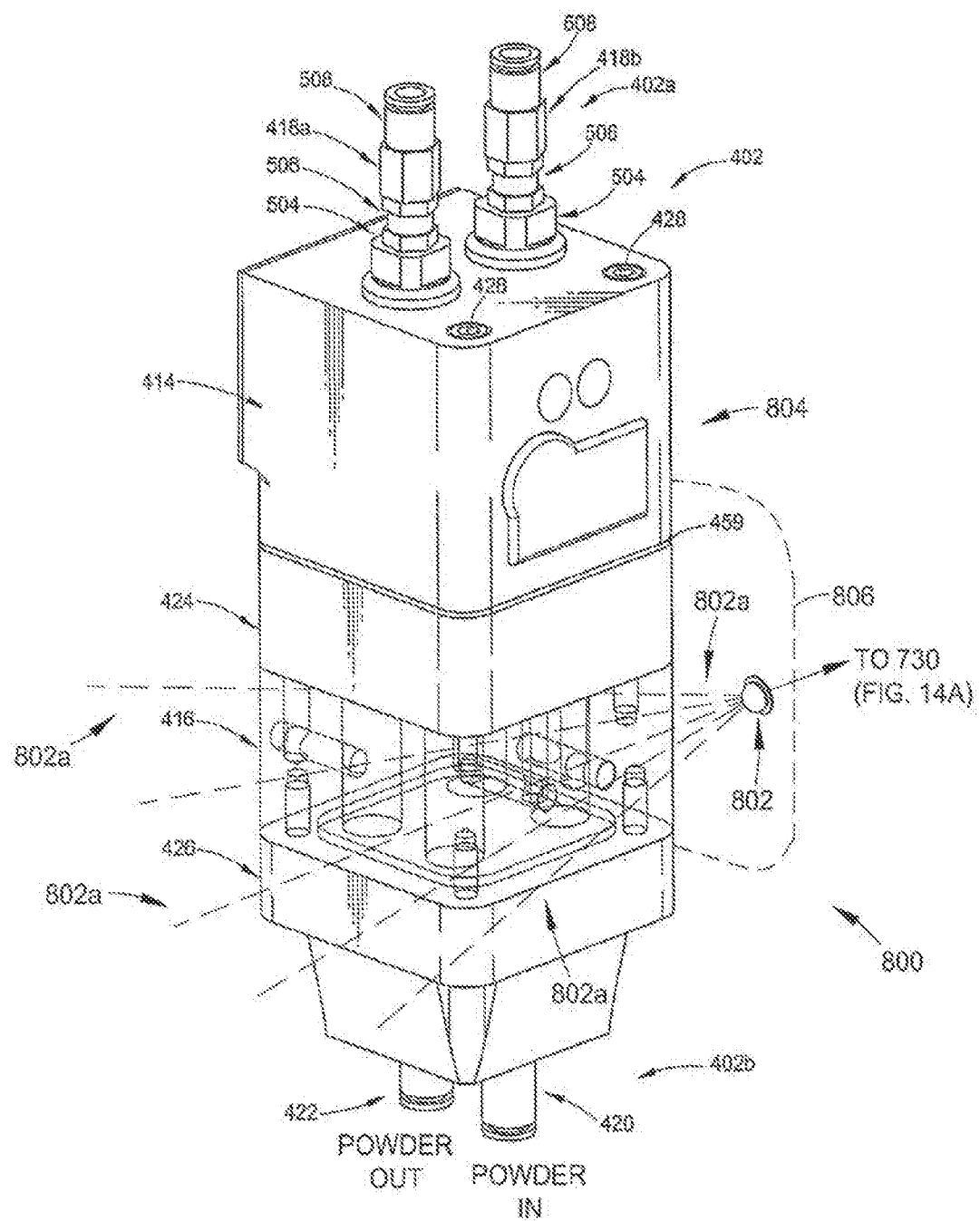
FIG. 17 illustrates an embodiment of a diagnostic indicator.

With reference to FIG. 17, a diagnostic indicator 800 is illustrated. In an embodiment, a light source 802, preferably from a lamp 802-1 that emits preferably colored light 802a (represented by the dashed lines in FIG. 17)—although clear or white light would be an available option—is disposed in close proximity to a pump 804. The pump 804 may be any pump, but in FIG. 17 we show a pump that may be the same as pumps 402 and 702 described hereinabove. Therefore, like reference numerals are used and the description need not be repeated. The lamp 802 may alternatively be disposed inside the pump 804 or on an exterior surface of the pump 804 or in close proximity to the pump 804 as illustrated in FIG. 17. The lamp 802 may be interfaced to the processing system 730 (FIG. 14A) or other control function so that the lamp is illuminated under various operating conditions of the pump 804 to serve as a visual diagnostic apparatus. For example, the lamp 802 may be continuously illuminated during the time that the pump 804 is running properly and normally, and may be extinguished when the pump is off or at least is not being used to pump powder coating material. In the case of large coating operations where there are many pumps in use, the lamp provides an easy an optionally remote distance way to quickly verify the status of the pump without having to walk over to a computer or to visually inspect the pump at close range.

The lamp 802 may be any suitable lamp or light source that provides the color and intensity desired for easy recognition. Multi-colored lights may be used to display color coded status. For example, green status may be used to indicate the pump is running normal, yellow status may be used as a warning color that a problem may be occurring, and red status may be used to indicate a need to shutdown or a fault is detected. Alternatively, rather than using multiple colors, the lamp 802 may be activated in a pulsed fashion as a coded status. For example, a solid continuous light status may indicate normal operation whereas a fast blinking light status may be used as a fault detection and a slow blinking light status may be used as an alert that there may be a problem. The operational status of the lamp 802 may be set by the control system 39 or the processing system 730 based, for example, on diagnostic test results as described herein above. However, the use of the diagnostic indicator 800 may be used as a separate feature by itself without the use of the diagnostic apparatus and methods described herein above as to FIGS. 14A-16D.

As shown in FIG. 17, the pump 804 may be but need not be a pump as described herein. Whatever pump design is used, the pump design may include a transparent valve body 416 as noted hereinabove. The use of a transparent valve body 416 allows the light 802a to glow and disperse to a greater degree for visual observation. But as noted, the light source may alternatively be installed on the pump 804 or in close proximity to be associated visually with a particular pump so that a transparent feature would not be required. For example, pumps 804 are often mounted in banks on a panel 806, such that the lamps 802 may be mounted on the panel 806 if so desired.

Additional enumerated embodiments are set forth as follows.

1. A pump and diagnostic apparatus for a powder coating material system, comprising:
    a pump chamber comprising a gas permeable member disposed in a pressure chamber;
    a first pinch valve and a second pinch valve wherein each of said first pinch valve and second pinch valve forms part of a flow path for powder coating material in fluid communication with said pump chamber;
wherein during pump operation powder coating material flows into said pump chamber through said first pinch valve when negative pressure is applied to said pressure chamber and material flows out of said pump chamber through said second pinch valve when positive pressure is applied to said pressure chamber;
a diagnostic apparatus comprising a first detector to detect a fault associated with said first pinch valve, said first detector comprising a pressure detector, a flow detector or both.

2. The apparatus of 1 comprising a second detector to detect a fault associated with said second pinch valve, said second detector comprising a pressure detector, a flow detector or both.

3. The apparatus of 1 wherein said first detector is external the pump, said first detector being connectable with an external suction port of the pump, said first detector will detect that said external suction port is under negative pressure or has air flow when said first pinch valve has a leakage fault.

4. The apparatus of 2 wherein said second detector is external the pump, said second detector being connectable with an external pressure port of the pump, said second detector will detect that said external pressure port is under positive pressure or has air flow when said second pinch valve has a leakage fault.

5. The apparatus of 1 comprising a suction pressure source that is connectable to be in fluid communication with said pressure chamber through a first valve, said first detector is external the pump, said first detector being connectable with an external suction port of the pump, said first detector will detect pressure or air flow when said first pinch valve is open and said suction pressure source is applying suction to said pressure chamber.

6. The apparatus of 2 comprising a positive pressure source that is connectable to be in fluid communication with said pressure chamber through a second valve, said second detector is external the pump, said second detector being connectable with an external pressure port of the pump, said second detector will detect pressure or air flow when said second pinch valve is open and said positive pressure source is applying pressure to said pressure chamber.

7. The apparatus of claim 2 comprising a suction pressure source that is connectable to be in fluid communication with said pressure chamber through a first valve, said first detector is external the pump, said first detector being connectable with an external suction port of the pump, said first detector will detect pressure or air flow when said first pinch valve is open and said suction pressure source is applying suction to said pressure chamber, and a positive pressure source that is connectable to be in fluid communication with said pressure chamber through a second valve, said second detector is external the pump, said second detector being connectable with an external pressure port of the pump, said second detector will detect pressure or air flow when said second pinch valve is open and said positive pressure source is applying pressure to said pressure chamber.

8. The apparatus of 1 or 2 comprising a control system that receives a first detector output and a second detector output and determines fault conditions in either or both of said first pinch valve and said second pinch valve as a function of said first detector output and a second detector output.

9. The apparatus of 1 or 2 wherein said first detector and said second detector are internal the pump.

10. A pump and diagnostic apparatus for a powder coating material system, comprising:
a pump chamber comprising a gas permeable member disposed in a pressure chamber wherein during pump operation powder coating material flows into said pump chamber when negative pressure is applied to said pressure chamber and flows out of said pump chamber when positive pressure is applied to said pressure chamber;
a pinch valve that forms part of a flow path for powder coating material that is in fluid communication with said pump chamber;
a diagnostic apparatus comprising a first detector that will detect a fault associated with said pinch valve, said first detector comprising a pressure detector, a flow detector or both.

11. The apparatus of 10 comprising a second detector that will detect a fault associated with said gas permeable member, said second detector comprising a pressure detector, a flow detector or both.

12. A pump and diagnostic apparatus for a powder coating material system, comprising:
a pump chamber comprising a gas permeable member disposed in a pressure chamber wherein during pump operation powder coating material flows into said pump chamber when negative pressure is applied to said pressure chamber and flows out of said pump chamber when positive pressure is applied to said pressure chamber;
a diagnostic apparatus comprising a first detector that will detect a fault associated with pressure or flow within said gas permeable member, said first detector comprising a pressure detector, a flow detector or both.

13. The apparatus of 12 comprising a pinch valve that forms part of a flow path for powder coating material that is in fluid communication with said pump chamber, and a second detector that will detect a fault associated with said pinch valve, said second detector comprising a pressure detector, a flow detector or both.

14. A pump and diagnostic apparatus for a powder coating material system, comprising:
a pump chamber comprising a gas permeable member disposed in a pressure chamber wherein during pump operation powder coating material flows into said pump chamber when negative pressure is applied to said pressure chamber and flows out of said pump chamber when positive pressure is applied to said pressure chamber;
a pinch valve that forms part of a flow path for powder coating material that is in fluid communication with said pump chamber;
a diagnostic apparatus comprising: a first detector that will detect a fault associated with said pinch valve, said first detector comprising a pressure detector, a flow detector or both; and a second detector that will detect a fault associated with said gas permeable member, said second detector comprising a pressure detector, a flow detector or both.

15. A pump and diagnostic apparatus for a powder coating material system, comprising:
a pump chamber comprising a gas permeable member disposed in a pressure chamber wherein during pump operation powder coating material flows into said pump chamber when negative pressure is applied to said pressure chamber and flows out of said pump chamber when positive pressure is applied to said pressure chamber;

a pinch valve that forms part of a flow path for powder coating material that is in fluid communication with said pump chamber;

a diagnostic apparatus that will detect a fault associated with said gas permeable member, said pinch valve or both, said diagnostic apparatus comprising a pressure detector, a flow detector or both.

16. Apparatus according to any preceding claim wherein said diagnostic apparatus is external the pump, is internal the pump, or is a combination of external and internal the pump.

17. Apparatus according to any preceding claim wherein any one or more of the following are provided: said pump comprises a dense phase pump; a powder coating material spray gun; a powder coating spray booth; a source of powder coating material.

18. A diagnostic method for detecting a fault in a powder coating pump, comprising:
at least partially operating the pump by applying pressure to a pressure chamber,
closing a pinch valve,
using pressure or flow or both to detect a fault associated with the pinch valve.
using pressure or flow or both to detect a fault associated with a gas permeable member disposed in the pressure chamber.

19. A diagnostic method for detecting a fault in a powder coating pump, comprising:
at least partially operating the pump by applying pressure to a pressure chamber,
using pressure or flow or both to detect a fault associated with pressure or flow within a gas permeable member disposed in the pressure chamber.

20. A diagnostic method for detecting a fault in a powder coating pump, comprising:
at least partially operating the pump by applying pressure to a pressure chamber,
closing a pinch valve,
using pressure or flow or both to detect a fault associated with the pinch valve.

21. A diagnostic method for detecting a fault in a powder coating pump, comprising:
applying pressure to a pressure chamber having a pinch valve disposed therein,
using pressure or flow or both to detect a fault associated with said pinch valve.

22. A diagnostic device comprising: a pump that pumps powder coating material, and a light source in close proximity to said pump, said light source having an on condition and an off condition wherein one or both of said on condition and off condition provides information about the pump performance.

23. The diagnostic device of 22 wherein an observer looking at said pump also can observe said on condition and said off condition of said lamp.

The inventions have been described with reference to exemplary embodiments. Modifications and alterations will occur to others upon a reading and understanding of this specification and drawings. The inventions are intended to include all such modifications and alterations insofar as they come within the scope of the appended claims or the equivalents thereof.

We claim:

1. A diagnostic method for detecting a fault in a powder coating pump, comprising:
applying air pressure to a pressure chamber of the powder coating pump to close a pinch valve disposed in said pressure chamber; and
detecting, when said pinch valve is closed, air pressure or air flow or both, in or at said pressure chamber, an inlet port of the powder coating pump, or an outlet port of the powder coating pump, to determine whether there is a leak associated with said pinch valve.

2. The diagnostic method of claim 1, wherein the detecting step includes detecting air pressure or air flow or both that is in said pressure chamber.

3. The diagnostic method of claim 1, wherein the detecting step includes detecting air pressure or air flow or both at an inlet port or an outlet port of the powder coating pump.

4. The diagnostic method of claim 1, wherein the detecting step includes detecting air pressure or air flow or both that is in an air flow passage of the powder coating pump, wherein said air flow passage is in-line with said pinch valve.

5. A diagnostic method for detecting a fault in a powder coating pump, comprising:
applying air pressure to a pressure chamber of the powder coating pump, said pressure chamber having an air permeable filter member disposed therein; and
detecting air pressure or air flow or both that is in at least one air flow passage of the powder coating pump to determine air flow through the air permeable filter member, wherein said at least one air flow passage is in-line with said pressure chamber and said air permeable filter member.

6. The diagnostic method of claim 5, wherein the detecting step includes detecting air pressure or air flow or both that is in said pressure chamber.

7. The diagnostic method of claim 5, wherein the detecting step includes detecting air pressure or air flow or both at an inlet port or an outlet port of the powder coating pump.

8. The diagnostic method of claim 5, wherein said at least one air flow passage is a suction flow path or a delivery flow path, and wherein suction air flow out of said pressure chamber through said air permeable filter member pulls powder coating material into said pressure chamber along said suction flow path and delivery air flow into said pressure chamber through said air permeable filter member pushes powder coating material out of said pressure chamber along said delivery flow path.

9. The diagnostic method of claim 5, wherein the detecting step includes detecting air pressure or air flow or both that is in said at least one air flow passage of the powder coating pump with at least one detector of a diagnostic apparatus to determine air flow through the air permeable filter member.

10. The diagnostic method of claim 9, wherein said at least one detector comprises a pressure detector, an air flow rate detector, or both.

11. The diagnostic method of claim 9, wherein said diagnostic apparatus comprises a housing comprising a diagnostic port for admitting air flow and said at least one detector, the method further comprising:
connecting said diagnostic port to said at least one air flow passage.

12. The diagnostic method of claim 5, wherein said powder coating pump includes a pinch valve configured to close when air pressure is applied to said pressure chamber, the method further comprising:

detecting, when said pinch valve is closed, whether said pinch valve is leaking.

13. The diagnostic method of claim 1, wherein the detecting step includes detecting air pressure or air flow or both with at least one detector of a diagnostic apparatus to determine whether there is a leak associated with said pinch valve.

14. The diagnostic method of claim 13, wherein said at least one detector comprises a pressure detector, an air flow rate detector, or both.

15. A diagnostic method for detecting a fault in a powder coating pump, comprising:
- applying air pressure to a pressure chamber of the powder coating pump to close a pinch valve disposed in said pressure chamber;
- detecting, when said pinch valve is closed, air pressure or air flow or both to determine whether there is a leak associated with said pinch valve; and
- detecting, when said pinch valve is open, whether one or more air seals of said powder coating pump are leaking.

16. The diagnostic method of claim 1, wherein suction air flow out of said pressure chamber through said pinch valve pulls powder coating material into said pressure chamber along a suction flow path and delivery air flow into said pressure chamber through said pinch valve pushes powder coating material out of said pressure chamber along a delivery flow path.

17. The diagnostic method of claim 16, further comprising implementing a diagnostic device and at least one detector for determining whether there is a leak associated with said pinch valve, wherein said diagnostic device comprises a housing comprising a diagnostic port for admitting air flow and said at least one detector, the method further comprising:
- connecting said diagnostic port to at least one of said suction flow path and said delivery flow path.

18. The diagnostic method of claim 17, wherein said connecting step includes connecting said diagnostic port in-line with at least one of said suction flow path and said delivery flow path.

19. The diagnostic method of claim 17, wherein the pinch valve is a first pinch valve and the powder coating pump further comprises a second pinch valve, wherein one of the first and second pinch valves is an inlet pinch valve that opens to allow the powder coating material to be drawn into the pressure chamber and the other of said first and second pinch valves is an outlet pinch valve that opens to allow the powder coating material to be pushed out of the pressure chamber, the method further comprising:
- connecting said diagnostic port to at least one of said suction flow path and said delivery flow path to detect air flow relating to one or more of the pressure chamber, the inlet pinch valve, or the outlet pinch valve.

* * * * *